US012706822B1

(12) United States Patent
Pote et al.

(10) Patent No.: US 12,706,822 B1
(45) Date of Patent: Aug. 11, 2026

(54) INTELLIGENT COMPOSITE AND ROLL-UP ANALYSIS OF EN ROUTE TRAFFIC FLOW FOR EFFICIENT DATA LOSS PREVENTION

(71) Applicant: Aryaka Networks, Inc., Santa Clara, CA (US)

(72) Inventors: Parag Pote, Bangalore (IN); Srinivasa Addepalli, San Jose, CA (US)

(73) Assignee: Aryaka Networks, Inc.

( * ) Notice: Subject to any disclaimer, the term of this patent is extended or adjusted under 35 U.S.C. 154(b) by 0 days.

(21) Appl. No.: 19/452,626

(22) Filed: Jan. 19, 2026

(51) Int. Cl.
*H04L 43/0829* (2022.01)
*H04L 43/02* (2022.01)

(52) U.S. Cl.
CPC .......... *H04L 43/0829* (2013.01); *H04L 43/02* (2013.01)

(58) Field of Classification Search
CPC ..... H04L 43/02; H04L 43/0829; H04L 43/12; H04L 43/14; H04L 63/30; H04L 63/302; H04L 63/304; H04W 12/02; H04W 12/80
See application file for complete search history.

(56) References Cited

U.S. PATENT DOCUMENTS 10,169,789 B2 1/2019 Barday et al.
11,025,675 B2 6/2021 Barday et al.
12,231,403 B2 2/2025 Devarajan et al.
12,314,288 B2 * 5/2025 Zhang ..................... H04L 67/10
12,381,915 B2 8/2025 Barday et al.
2012/0159565 A1 * 6/2012 Bray ..................... G06Q 10/10 726/1
2012/0210437 A1 * 8/2012 Karande ................. G06F 21/54 726/26
2019/0171846 A1 * 6/2019 Conikee .............. G06F 21/6245
2022/0200977 A1 * 6/2022 Singh ....................... H04L 63/08
2022/0253430 A1 * 8/2022 Paul .................... G06F 16/2255
2024/0419837 A1 * 12/2024 Sankaranarayanan ....................... G06F 21/6245

FOREIGN PATENT DOCUMENTS

GB 2560671 B 9/2018

* cited by examiner

*Primary Examiner* — Kostas J Katsikis
(74) *Attorney, Agent, or Firm* — FP; Sikander M. Khan

(57) ABSTRACT

Systems and methods for obviating inefficient data loss prevention (DLP) due to redundant consideration of individual traffic characteristics of en route traffic flow are presented. The method includes intercepting an en route traffic flow between a pair of traffic exchangers in the network of traffic exchangers. The method includes detecting a multiplicity of primitive traffic characteristics of the en route traffic flow. The multiplicity of primitive traffic characteristics are data loss inspectable by M data loss inspectors. The method includes together-analyzing the multiplicity of primitive traffic characteristics based on a composite view of the multiplicity of primitive traffic characteristics. Based on the together-analysis of the multiplicity of primitive traffic characteristics, in-line determining that N data loss inspectors satisfy accurate data loss inspection of the en route traffic flow. The method includes in-line data loss inspecting the en route traffic flow using the N data loss inspectors.

17 Claims, 14 Drawing Sheets

Intercepting an en route traffic flow between a pair of traffic exchangers in the network of traffic exchangers 1005

Detecting a multiplicity of primitive traffic characteristics of the en route traffic flow, the multiplicity of primitive traffic characteristics being data loss inspectable by *M* data loss inspectors 1010

Together-analyzing the multiplicity of primitive traffic characteristics based on a composite view of the multiplicity of primitive traffic characteristics 1015

Determining that N data loss inspectors satisfy accurate data loss inspection of the en route traffic flow while *N* is smaller than *M* 1020

In-line selecting the *N* data loss inspectors, and in-line data loss inspecting the en route traffic flow using the *N* data loss inspectors 1025

FIG. 10

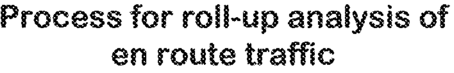

Intercepting an en route traffic flow between a pair of traffic exchangers in the network of traffic exchangers 1105

Detecting a multiplicity of primitive traffic characteristics of the en route traffic flow, the multiplicity of primitive traffic characteristics being data loss inspectable by individual data loss inspectors 1110

Together-analyzing the multiplicity of primitive traffic characteristics based on a rolled-up view of the multiplicity of primitive traffic characteristics 1115

Determining that at least one umbrella data loss inspector satisfies accurate data loss inspection of the en route traffic flow by aggregating functionalities of the multiplicity of individual data loss inspectors 1120

In-line selecting the umbrella data loss inspector, and in-line data loss inspecting the en route traffic flow using the umbrella data loss inspector instead of using the multiplicity of individual data loss inspectors 1125

FIG. 11

INTELLIGENT COMPOSITE AND ROLL-UP ANALYSIS OF EN ROUTE TRAFFIC FLOW FOR EFFICIENT DATA LOSS PREVENTION

CROSS-REFERENCE TO RELATED APPLICATIONS

This application claims priority under to Indian Provisional Patent Application No. 202541122272, filed on Dec. 5, 2025, and titled "INTELLIGENT COMPOSITE AND ROLL-UP ANALYSIS OF EN ROUTE TRAFFIC FLOW FOR EFFICIENT DATA LOSS PREVENTION," the entire contents of which are hereby incorporated by reference in their entirety for all purposes.

TECHNICAL FIELD

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. Specifically, the technology disclosed relates to dynamic selection of data loss inspectors to prevent data exfiltration and to enforce regulatory compliance.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The wide-spread adoption and use of cloud-based applications, web-based applications and large language models (LLMs) has considerably increased the amount of data shared across various geographic regions, enterprises, institutions, etc. The sharing of data increases risk of exfiltration of sensitive data. Various techniques are being developed and deployed to prevent data leakage. Such techniques are commonly referred to as data loss prevention (or DLP) techniques. DLP comprises a variety of methods and tools for prevent loss, misuse or unauthorize access of sensitive data.

Data loss inspectors (also referred to as identifier objects, data type objects, etc.) are created as part of data loss prevention systems to identify sensitive data and prevent the loss of such data by applying pre-defined policies. The data loss inspectors are specifically designed by human experts for particular data loss prevention goals. For example, a data loss inspector can be created for financial data related to the United States. This data loss inspector can have logic to detect financial data such as credit card information, debit card information and information related to various other types of loyalty, membership, travel cards, etc. Hundreds of such data loss inspectors can be created, each designed for specific data compliance and/or geographic region. Identifying the appropriate data loss inspectors for inspecting particular data is a challenge. Applying too many data loss inspectors to inspect the particular data can overburden the system with compute and memory requirements while not selecting appropriate data loss inspectors can cause loss of sensitive information.

An opportunity arises to develop systems and methods for automatically selecting a subset of data loss inspectors from a superset of all available data loss inspectors such that the subset of data loss inspectors efficiently inspect the data.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 10 presents an example flowchart illustrating process operations for composite analysis to select data loss inspectors for en route traffic flow.

FIG. 11 presents an example flowchart illustrating process operations for roll-up analysis to select data loss inspectors for en route traffic flow.

DETAILED DESCRIPTION

Figure 1:
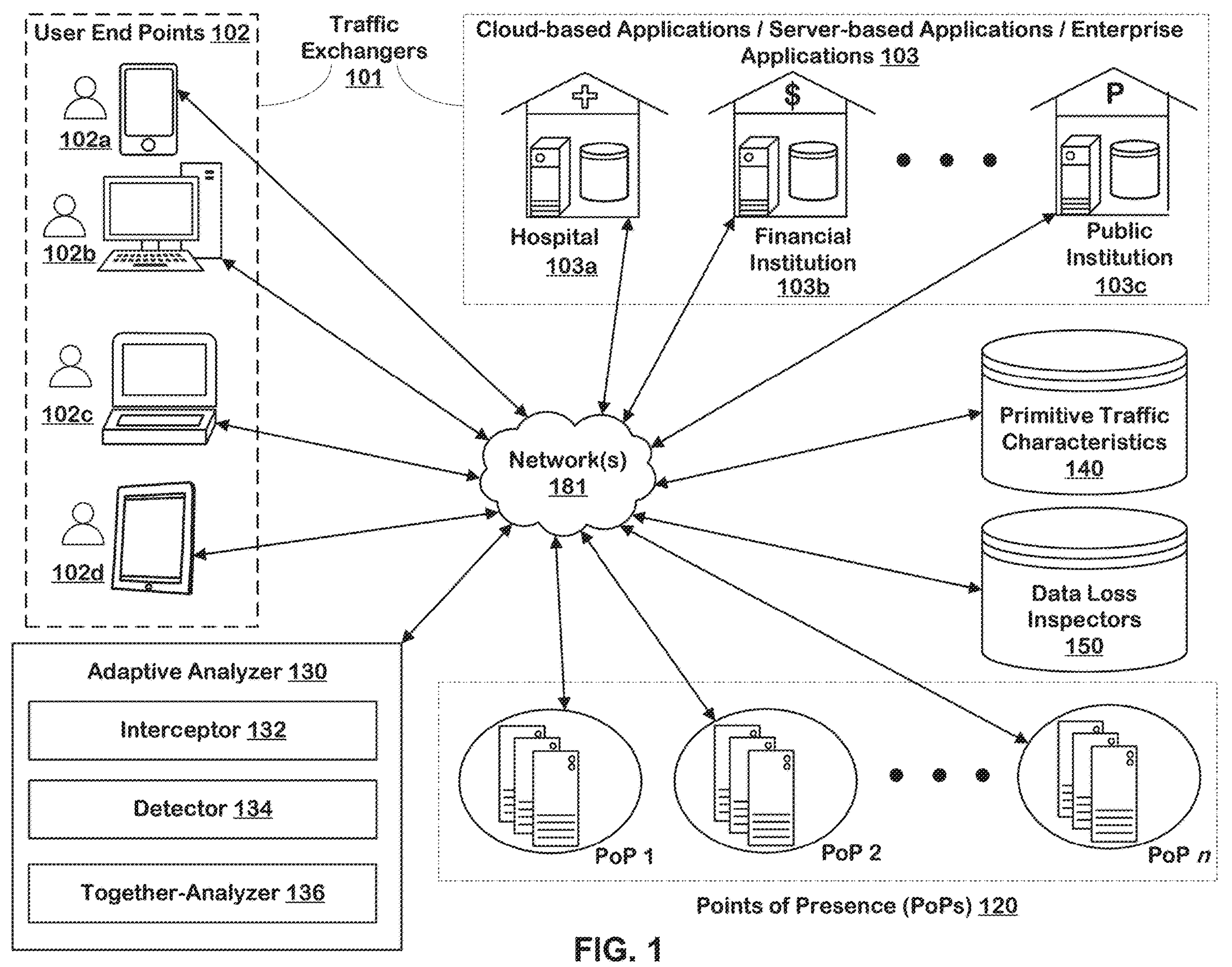
FIG. 1 presents an example environment in which the proposed data loss prevention (DLP) technology can dynamically select data loss inspectors for en route traffic flow.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

INTRODUCTION

The technology disclosed transforms data loss prevention from brute-force scanning to intelligent precision. By analyzing multiple traffic characteristics together such as source, destination, content type, and application type it identifies the minimal yet most effective set of data loss prevention (or DLP) inspectors needed for each data flow. Through its composite and roll-up analytics, the system eliminates redundant inspections, accelerates in-line processing, and ensures compliance across regions and regulations. The result is a smarter, faster, and more adaptive approach to safeguarding enterprise data in motion.

Security vendors must deliver DLP solutions that safeguard enterprise data across diverse cloud environments. These solutions must account for numerous dimensions, such as data types, application categories, jurisdictions, and regulatory requirements. As a result, organizations often deploy a vast number of DLP scanners (or inspectors) designed to handle thousands of possible combinations of incoming (or outgoing) traffic attributes. This complexity leads to bloated and inefficient DLP architectures, where each incoming (or outgoing) traffic flow is sequentially evaluated against an excessive number of scanners.

The disclosed technology addresses this inefficiency by eliminating redundant consideration of individual traffic characteristics and redundant application of individual DLP scanners (or data loss inspectors). Instead of invoking separate DLP scanners for each characteristic of a traffic flow, the technology disclosed analyzes all characteristics collectively to determine a minimal, yet sufficient set of scanners needed for accurate inspection.

For example, consider a traffic flow characterized by seven distinct characteristics (or attributes). Traditional DLP systems might trigger seven specialized scanners-one per characteristic. In contrast, the disclosed approach evaluates these characteristics (or attributes) together and identifies overlapping capabilities among data loss inspectors (or scanners). It then selects only a subset of inspectors necessary for precise inspection, thereby reducing redundancy and improving efficiency.

In one implementation, the technology disclosed recognizes that several specialized data loss inspectors share redundant functionalities and intelligently selects only those required to achieve comprehensive coverage. In another implementation, it identifies an umbrella or composite data loss inspector that effectively substitutes multiple specialized inspectors.

For instance, if the traffic originates from the UK, is destined for Norway, and contains personal health data associated with a healthcare application, conventional systems would invoke static set of multiple scanners and not just-UK-specific, Norway-specific, and health-specific (e.g., PII, PCI DSS). The disclosed technology, however, automatically determines that a single GDPR-compliant DLP scanner can serve as an umbrella substitute, aggregating the functionalities of all these scanners into one.

Thus, the technology disclosed improves operational efficiency in two ways:

1. Selective reduction: Using only a minimal subset of applicable DLP inspectors.
2. Composite substitution: Replacing multiple inspectors with one or more umbrella inspectors.

Both approaches conserve compute and memory resources, reduce latency, and maintain high inspection accuracy.

Moreover, inspector selection occurs dynamically on a per-traffic-flow basis. For each incoming flow, the system adaptively determines the most efficient inspector (or scanner) configuration-balancing accuracy, compliance, and resource utilization.

In yet another implementation, the system may apply a triplet of source region-specific, destination region-specific, and content type-specific inspectors (or scanners) to each traffic flow. This selection is based on real-time analysis of geolocation and content attributes, further optimizing DLP performance and adaptability.

An example environment in which the proposed data loss prevention (DLP) technology can dynamically select data loss inspectors for a plurality of en route traffic flows is presented in FIG. 1.

System Overview

The technology disclosed provides a system to dynamically select data loss inspectors for en route traffic flows. With a lot of data getting shared across cloud, many organizations specifically in the areas of security, cyber security, security service edge (or SSE), secure access service edge (or SASE) are concerned about data exfiltration when data is accessed from cloud-based storage or data is uploaded to cloud-based storage locations. Systems and methods are needed that provide a way to avoid data leakage and prevent data exfiltration through en route traffic flows. Data loss prevention (DLP) can comprise techniques, tools and processes used to ensure that sensitive data is not lost, misused, or accessed by any unauthorized users. DLP techniques help in securing of regulated, confidential, and business critical data. DLP techniques can be used to identify violations of data protection policies defined by enterprises or driven by regulatory compliance requirements such as Health Insurance Portability and Accountability Act of the United States (HIPAA), Payment Card Industry Data Security Standard (PCI-DSS), personally identifiable information (PII), or General Data Protection Regulation (GDPR) of European Union, etc. Because of the variety and diversity of data transmitted and received by traffic exchangers (such as user endpoints, cloud-based applications, server-based applications, enterprise applications, etc.) across the globe, it is a challenge to define a set of data loss inspectors that can reliably inspect data flows. This set of data loss inspectors must satisfy the requirements of data loss prevention as defined by the organizations, enterprises and/or the regulatory authorities in various regions and jurisdictions.

Existing techniques to select data loss inspectors for en route traffic flows are inefficient because of manual selection and/or static selection of data loss inspectors. The total number of data loss inspectors can be in the hundreds and up to a thousand or more. Therefore, it is inefficient to include all available data loss inspectors for a particular en route traffic flow for performance and memory reasons. Furthermore, a majority of data loss inspectors (e.g., up to 80 percent or more) may not be necessary for a particular en route traffic flow. Selecting a large number of data inspectors for a particular en route traffic flow can in fact make the data loss inspection process inefficient due to compute and memory requirements. Therefore, it is desirable to provide systems and methods for efficient selection of data loss inspectors that not only satisfy the requirements for data loss inspection but also perform these operations in an efficient manner with minimal computing and memory resources. The technology disclosed provides systems and methods for obviating inefficient data loss prevention (DLP).

Various implementations of the technology disclosed are presented with reference to FIGS. 1 to 14 to secure flow of data between data exchangers. FIG. 1 presents an example high-level schematic of a system in accordance with an implementation. Because FIG. 1 is an architectural diagram, certain details are intentionally omitted to improve the clarity of the description. The discussion of FIG. 1 is organized as follows. First, the elements of the figure will be described, followed by their interconnections. Then, the use of the elements in the system will be described in greater detail.

FIG. 1 includes a plurality of traffic exchangers 101. The traffic exchangers 101 can comprise a plurality of user endpoints (102). The user endpoints can comprise a variety of computing devices such as a smartphone 102*a*, a desktop computing device 102*b*, a laptop 102*c*, a tablet 102*d*, etc. The user endpoints 102 can run various types of software applications that can send and receive data and therefore act as traffic exchangers. It is understood that the computing devices 102, illustrated in FIG. 1, do not represent a comprehensive list of computing devices supported by technology disclosed. The traffic exchangers 101 can also include cloud-based applications, server-based applications or other types of applications that may reside on data centers, servers, enterprise networks, etc., identified by a label 103 in FIG. 1. An example of such applications can include health-related application (103*a*) such as a hospital information management system, a government health department website, etc. Other examples of cloud-based applications include Internet banking applications (103*b*) or websites that allow users to make financial transactions. Another example of such applications include government websites that allow citizens to access public services (103*c*) such as employment insurance, social security, tax-related services, etc. The various data exchangers 101 can receive and/or send data via a network(s) 181 forming a network of traffic exchangers. The traffic exchangers in the network of traffic exchangers can be client traffic exchangers, server traffic exchangers, user endpoints, cloud applications, etc.

The technology disclosed comprises a plurality of points of presence (PoPs) that can reside at physically diverse geographic locations. The PoPs (120) can act as access points for traffic exchangers 101 to connect to the Internet via the network(s) 181 and establish data flows (or flows) that transport data traffic (or traffic) from one traffic exchanger to another traffic exchanger. A point of presence (PoP) can reside in a user endpoint, in an enterprise network, on a cloud-based server, etc.

The technology disclosed comprises an adaptive analyzer 130 that can be deployed on a PoP or another location in the network. The adaptive analyzer 130 can comprise a plurality of components or engines such as an interceptor 132, a detector 134 and a together-analyzer 136. The adaptive analyzer comprises logic to obviate inefficient data loss prevention (DLP) due to redundant consideration of individual traffic characteristics of en route traffic flow. The adaptive analyzer (130) can be interposed amongst the network of traffic exchangers and configured to intermediate en route traffic flowing between traffic exchangers in the network of traffic exchangers.

In one implementation, the adaptive analyzer 130 is configured with a composite analysis logic to select a subset of data loss inspectors from a superset of data loss inspectors such that the selected subset of data loss inspectors can satisfy accurate data loss inspection of the en route traffic flow between traffic exchangers. The composite analysis logic can be implemented by a composite analyzer (not shown in FIG. 1) component. The composite analysis logic is further configured to perform the in-line data loss inspection of the en route traffic flow using the N data loss inspectors by in-line analyzing data and metadata of the en route traffic flow to in-line determine compliance of the en route traffic flow with data loss prevention policies of the N data loss inspectors. The N data loss inspectors represent a subset of a superset of M data loss inspectors. The composite analysis logic is further configured to complete the en route traffic flow when the en route traffic flow complies with the data loss prevention policies of the N data loss inspectors. The composite analysis logic is further configured to suspend (or block) the en route traffic flow when the en route traffic flow fails to comply with the data loss prevention policies of the N data loss inspectors. The in-line determination and the in-line selection further comprises the composite analysis logic choosing the N data loss inspectors after intercepting the en route traffic flow. The in-line determination and the in-line selection further comprises the composite analysis logic choosing the N data loss inspectors inimitably for the en route traffic flow on a per-flow basis based on the together analysis of the multiplicity of primitive traffic characteristics. The in-line determination and the in-line selection further comprises the composite analyzer choosing the N data loss inspectors directly within a data path of the en route traffic flow. The in-line determination and the in-line selection further comprises the composite analyzer choosing the N data loss inspectors on a real-time basis. The N data loss inspectors can be selected based on the N data loss inspectors aggregating functionalities of the M data loss inspectors. In this implementation, the N data loss inspectors implement the aggregated functionalities of the M data loss inspectors for the accurate data loss inspection of the en route traffic flow. The N data loss inspectors can be selected from a many-to-one mapping that maps the aggregated functionalities of the M data loss inspectors to the N data loss inspectors. The N data loss inspectors can be selected based on the N data loss inspectors having orthogonal functionalities independent of functionalities of the M data loss inspectors. The N data loss inspectors can implement the orthogonal functionalities for the accurate data loss inspection of the en route traffic flow. The size M of the superset of data loss inspectors can be periodically increased. The N data loss inspectors can be periodically updated for use in the accurate data loss inspection of future en route traffic flows. The new selections of the N data loss inspectors can be made for use in the accurate data loss inspection of future en route traffic flows. The many-to-one mapping is periodically updated for use in the accurate data loss inspection of future en route traffic flows. The N data loss inspectors can be used for the in-line data loss inspection throughout a life of the en route traffic flow. The life of the en route traffic flow is a session, for example in a web browser or a web-based application, etc. In one implementation, the N data loss inspectors may not overlap with the M data loss inspectors. In one implementation, the N data loss inspectors may partially overlap with the M data loss inspectors. The composite analysis logic is further configured to determine an originating geographic region of the en route traffic flow in dependence upon the source location of the en route traffic flow. The composite analysis logic is further configured to determine a destination geographic region of the en route traffic flow in dependence upon the destination location of the en route traffic flow. The composite analysis logic is further configured to determine at least one compliance protocol applicable to the type of the content transmitted by the en route traffic flow and/or the type of application facilitating the en route traffic flow. The composite analysis logic is further configured to make the in-line determination and the in-line selection of the N data loss inspectors based on combination of the originating geographic region, the destination geographic region, and the compliance protocol. The compliance protocol can be at least one of a Payment Card Industry Data Security Standard (PCI DSS) compliance protocol for financial data, a General Data Protection Regulation (GDPR) compliance protocol for personal data, or a Health Insurance Portability and Accountability Act (HIPAA) compliance protocol for health and medical data. It is understood that composite analysis logic can use other combinations of primitive traffic characteristics to make the in-line determination and the in-line selection of the N data loss inspectors. The examples of compliance protocols presented above are for illustration purposes and the technology disclosed can be used for data loss prevention for other compliance protocols not listed above.

In another implementation, the adaptive analyzer 130 is configured with roll-up analysis logic to determine at least one data loss inspector that can satisfy accurate data loss inspection of the en route traffic flow between traffic exchangers. The roll-up analysis logic is configured to perform a together-analysis for the multiplicity of primitive traffic characteristics based on a rolled-up view of the multiplicity of primitive traffic characteristics. Based on the together-analysis of the multiplicity of primitive traffic characteristics, the roll-up analysis logic is configured to in-line determine that at least one umbrella data loss inspector satisfies accurate data loss inspection of the en route traffic flow by aggregating functionalities of the multiplicity of individual data loss inspectors. The roll-up analysis logic is configured to in-line selecting the umbrella data loss inspector, and in-line data loss inspecting the en route traffic flow using the umbrella data loss inspector instead of using the multiplicity of individual data loss inspectors. The roll-up analysis logic can be implemented by a roll-up analyzer component (not shown in FIG. 1).

The adaptive analyzer 130 further comprises an interceptor 132 that is configured with logic to intercept flows of traffic between data exchangers for inspection to avoid unauthorized exfiltration of data from enterprises and/or to block unauthorized data from entering an enterprise network. The technology disclosed is applicable to entire spectrum of end users ranging from individual users who access the Internet from their homes to enterprise users who access the computing devices via their respective enterprise networks. Once the flow of traffic is intercepted by the interceptor (132), a detector 134 can detect a multiplicity of primitive traffic characteristics (also referred to as characteristics or parameters or traffic parameters) of the en route traffic flow. The multiplicity of primitive traffic characteristics can be inspected by one or more data loss inspectors to identify potential loss of data. The data loss inspectors can also identify data that can be harmful to the enterprise network (or an individual user endpoint) if received at a receiving user endpoint. The adaptive analyzer (130) includes a together-analyzer (136) configured with logic to together-analyze the multiplicity of primitive traffic characteristics based on a composite view of the multiplicity of primitive traffic characteristics. The together-analysis determines whether a subset of data loss inspectors can satisfy accurate data loss inspection of en route traffic flow or an umbrella data loss inspector, determined based on roll-up analysis, can satisfy accurate data loss inspection. Further details of the together-analysis is presented with reference to various scenarios of data loss prevention illustrated in FIGS. 4 to 9.

The adaptive analyzer 130 can access a plurality of databases that store various data for use in obviating inefficient data loss prevention (DLP). For example, a primitive traffic characteristics database 140 can store a plurality of characteristics (or parameters) that can be used by the detector (134) to determine which data loss inspectors can be applied to avoid data loss. A data loss inspectors database (150) can store a plurality of data loss inspectors that can be used to prevent data loss. The data loss inspectors are also referred to as data type objects or data identifier objects. The one or more databases disclosed herein are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein.

Completing the description of FIG. 1, the components, engines, endpoints, points of presence and databases described above, are all coupled in communication with the network(s) 181. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

Figure 2:
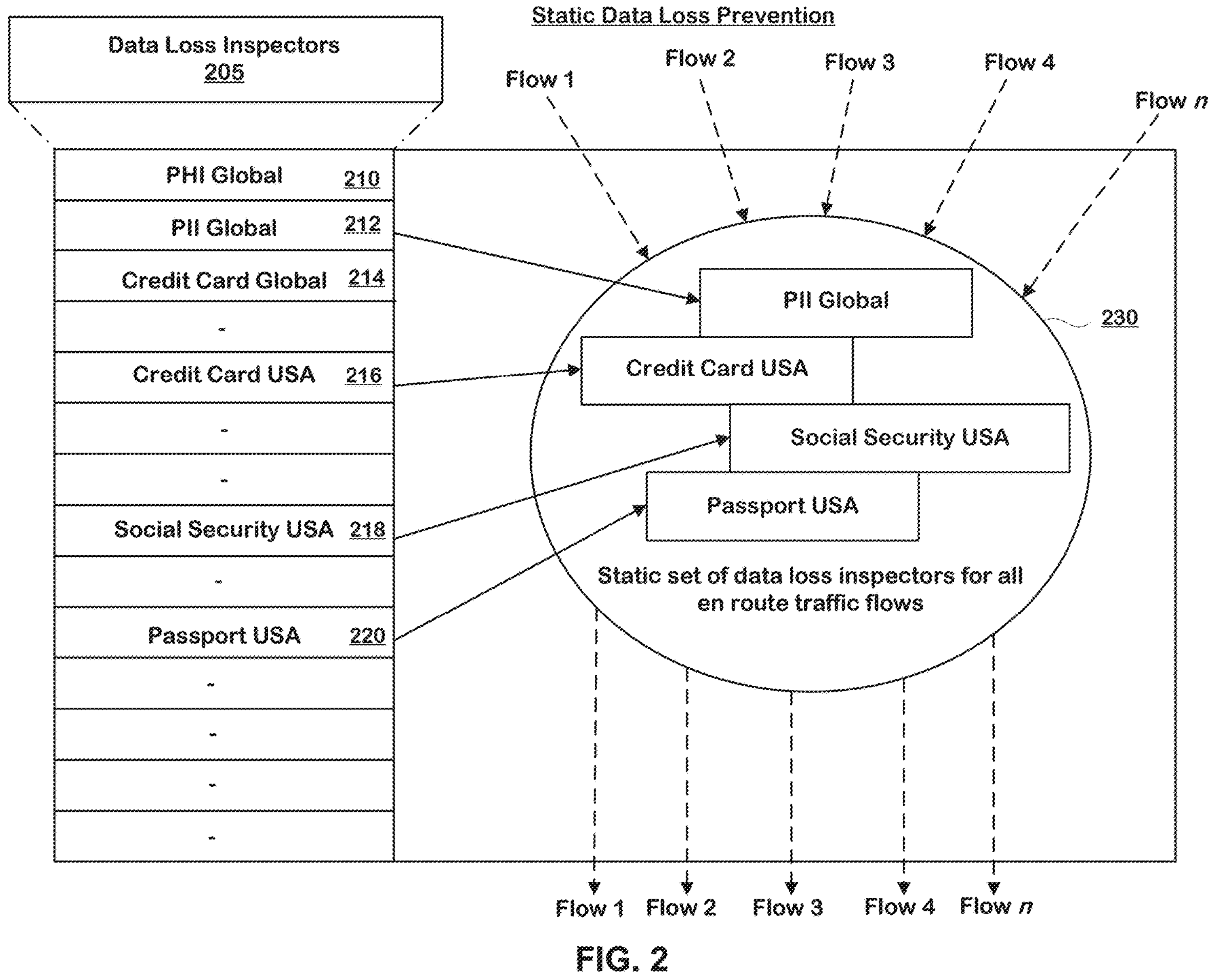
FIG. 2 presents an example of static data loss prevention technique in which data loss inspectors are pre-selected or manually selected by an administrator.
Figure 3:
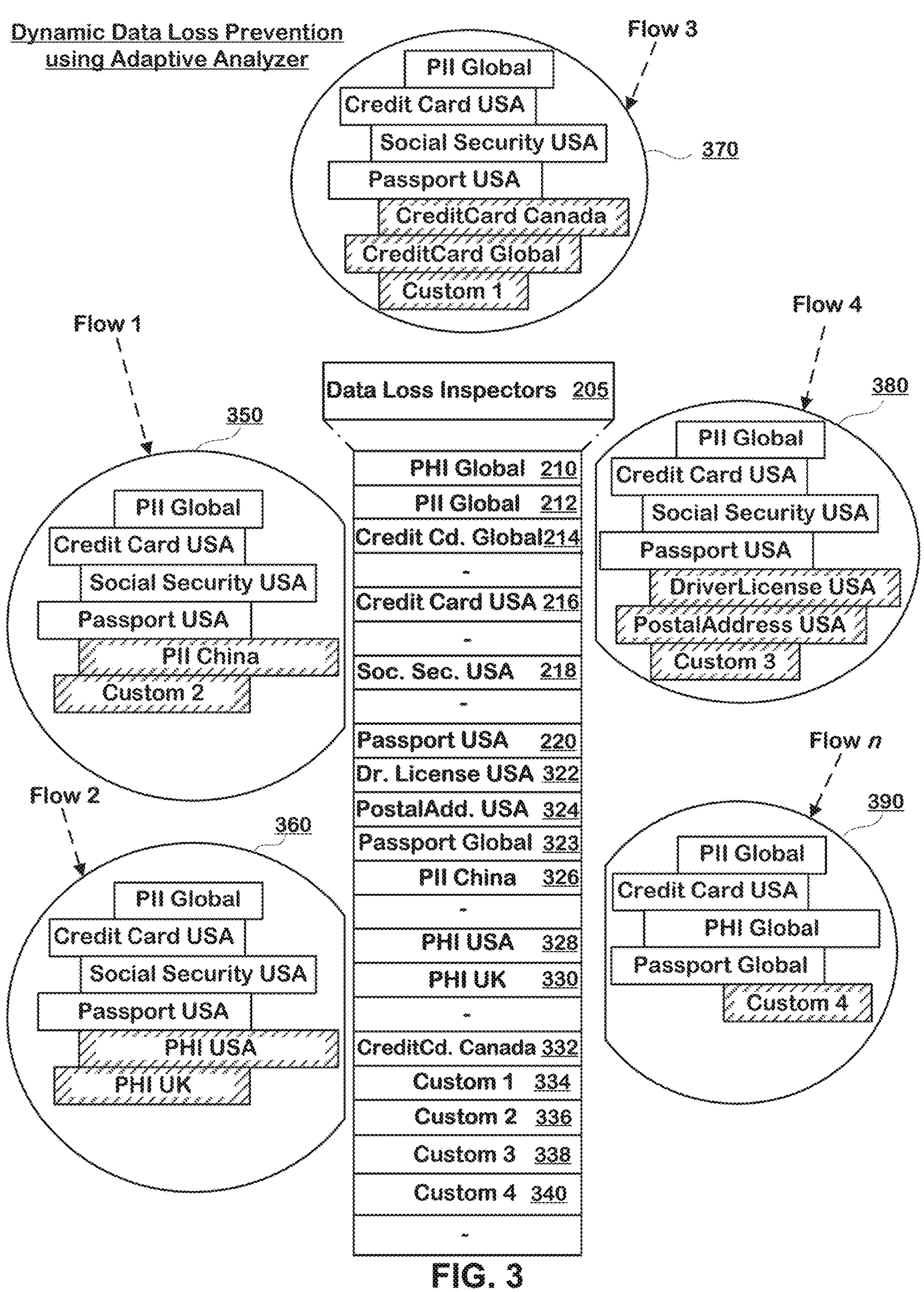
FIG. 3 presents an example of dynamic selection of data loss inspectors using the technology disclosed.

FIGS. 2 and 3 present examples that illustrate the advantages of the technology disclosed over existing data loss prevention techniques.

Static Vs. Dynamic Selection of Data Loss Inspectors

FIG. 2 presents an example of static data loss prevention technique in which data loss inspectors (205) are preselected or manually selected by an administrator. Selected examples of data loss inspectors (205) are presented in FIG. 2. Examples of data loss inspectors as illustrated in FIG. 2 include a PHI global data loss inspector (210), a PII global data loss inspector (212), a credit card global data loss inspector (214), a credit card USA data loss inspector (216), a social security USA data loss inspector (218) and a passport USA data loss inspector (220). It is understood that these data loss inspectors are presented for illustration purposes and many more data loss inspectors such as up to five hundred or more are available for inspection of en route traffic flows.

Five data flows comprising en route traffic between traffic exchangers are shown in FIG. 2. The data flows are labeled as flow 1, flow 2, flow 3, flow 4, and flow n, respectively. A circle 230 shows the data loss inspectors selected for inspecting the five data flows. The data loss inspectors can be selected manually by an administrator to inspect all data flows. The selection of data loss inspectors, as shown in FIG. 2, is independent of the multiplicity of primitive characteristics (or traffic characteristics) such as source location, destination location, content, uniform resource locator (URL), application type accessed, etc., for respective data flows. Therefore, the selected data loss inspectors may not provide accurate data loss prevention for all data flows. For some data flows, the selected data loss inspectors (as shown in circle 230) may not have sufficient inspection capability resulting in missed detection of valuable or sensitive data that may exfiltrate via a data flow. For some other data flows, the selected data loss inspectors (as shown in circle 230) may provide more than required data loss inspectors resulting in wasted compute and memory resources. The technology disclosed provides systems and methods that enable dynamic selection of data loss inspectors for each data flow comprising en route traffic between respective data exchangers. This dynamic selection of data loss inspectors is performed automatically based on characteristics of the data identified in respective data flows, as explained below.

Dynamic selection of data loss inspectors at runtime, i.e., when traffic is en route from a source location to a destination location, helps in more efficient and accurate data loss inspection. This is because the data loss inspectors are selected from a superset of data loss inspectors based on multiplicity of traffic characteristics (or primitive traffic characteristics) such as source and/or destination geographic locations, application type, URL category, URL score, device type (user-agent), source Internet Protocol (IP) location, destination IP location, latitude and longitude values identifying source and destination locations respectively, etc. The Data loss inspectors are selected as are suited for these characteristics (also referred to as network characteristics) of the data flow. For example, if the source location is in the United States, all data loss inspectors that have location metadata equals "United States" are selected from the superset of data loss inspectors. If the destination location is "China" then all data loss inspectors that have location metadata equals "United Kingdom" are selected from the superset of data loss inspectors. These selected data loss inspectors form a subset of data loss inspectors. The subset of data loss inspectors is further refined by using additional characteristics of data in the en route traffic. For example, if the application type is of category "health", the data loss inspectors for health-related data are included in subset. The URLs can also be categorized and their respective categories can be used to determine suitable data loss inspectors. A reputation score of the URL can be used to determine suitable data loss inspectors for en route traffic flow. For example, if the reputation score (or score) of the URL is higher than a predetermined threshold (such as above 80 on a scale of 1 to 100), then less stringent data inspection can be performed by selecting fewer data loss inspectors. However, for URLs with low scores, more stringent data inspections are performed by selecting more data loss inspectors. The technology disclosed can parse metadata information in the en route traffic flow such as in the hypertext transfer protocol (HTTP) header to identify metadata and use that as an input for selection of data loss protectors. For example, a host geographic location can be determined from the header metadata and used for selection of suitable data loss protectors.

FIG. 3 presents an example of dynamic selection of data loss inspectors using the adaptive analyzer (130) provided by the technology disclosed. FIG. 3 provides some additional examples of data loss inspectors (205). For example, a drivers license USA data loss inspector 322, a postal Address USA data loss inspector 324, a PII China data loss inspector 326, a PHI USA data loss inspector 328, a PHI UK data loss inspector 330, a credit card Canada data loss inspector 332, a custom 1 data loss inspector 334 and a custom 2 data loss inspector 336 are also shown as part of the superset of data loss inspectors (205). It is understood that examples of data loss inspectors presented in FIG. 3 are for illustration purposes only. The multiplicity of data loss inspectors in the superset of data loss inspectors can comprise one or more source region-specific data loss inspectors. The multiplicity of data loss inspectors in the superset of data loss inspectors can comprise one or more destination region-specific data loss inspectors. The multiplicity of data loss inspectors in the superset of data loss inspectors can comprise one or more content-specific data loss inspectors selected based on the content indicator identifying the type of the content transmitted by the en route traffic flow. For example, the content indicator can identify financial content, personal content, health and medical content, source code content, intellectual property content, legal content, payroll content, human resource content, and government content, etc. in an en route traffic flow. The multiplicity of data loss inspectors in the superset of data loss inspectors comprise one or more application-specific data loss inspectors selected based on the application indicator identifying the type of the application facilitating the en route traffic flow. For example, the application indicator can identify financial applications, personal applications, health and medical applications, source code applications, intellectual property applications, legal applications, payroll applications, human resource applications, and government applications, etc. The multiplicity of data loss inspectors in the superset of data loss inspectors can comprise one or more agent-specific data loss inspectors selected based on the agent indicator identifying the agent participating in the en route traffic flow. The technology disclosed is configured to detect one or more primitive characteristics (or traffic characteristics) in the en route traffic flow and based on the detected traffic characteristics, invoke application of the one or more data loss inspectors. For example, the technology disclosed can detect at least one source location or source region, at least one destination location or destination region in the route traffic flow. Similarly, the content indicator (or content type) characteristic can be determined identifying the type of the content transmitted by the en route traffic flow. An application type or application indicator characteristic can be determined identifying a type of application facilitating the en route traffic flow. An agent type or agent indicator can be determined identifying an agent participating in the en route traffic. In one implementation, the agent can be a large language model (LLM) and the data in the en route traffic can comprise a prompt or an input to the large language model. The technology disclosed can determine whether the prompt comprises any sensitive information being transmitted to the agent. Using, the technology disclosed, enterprises and other organizations can efficiently protect their sensitive information, intellectual property, code base, product designs, personal data or financial information from exfiltration or unauthorized use.

The superset of data loss inspectors 205 can comprise hundreds or up to a thousand or more data loss inspectors. FIG. 3 shows that, as opposed to example presented in FIG. 2, different data loss inspectors are selected for each of the data flows labeled as flow 1 (350), flow 2 (360), flow 3 (370), flow 4 (380), and flow n (390). It is understood that more than five or less than five data flows can be inspected using the technology disclosed. The adaptive analyzer 130 is configured with logic to select one or more data loss inspectors for each data flow by analyzing the en route traffic in respective data flows. The adaptive analyzer logic is configured to create a set that comprises a minimum number of data loss inspectors needed for satisfying data loss prevention requirements for a data flow. This set is created at runtime by inspecting en route traffic flow from one data exchanger to one or more other data exchangers.

The data flows, flow 1, flow 2, flow 3 and flow 4, as shown in FIG. 3 indicate en route traffic originating from a location in the United States. The data in flow 1 is destined for a location in China. The data in flow 2 is destined for a location in United Kingdom (or UK) with a uniform resource locator (or URL) in "health" data category. The data flow 3 is destined for a location in Canada and comprises data for a "finance" application. The data flow 4 is destined for a location in the United States. The data flow n comprises en route traffic that is received from a remote location (390). Circles labeled as 350, 360, 370, 380 and 390 correspond to flows 1, 2, 3 and 4, respectively. As all of these four data flows comprise data originating in the United States, therefore all of them include data loss inspectors PII global (212), credit card USA (216), social security USA (218) and passport USA (220). These data inspectors can efficiently inspect any personal data, originating from the United States, that might be included in en route traffic in one of the data flows (flow 1, flow 2, flow 3 and flow 4). Further, based on additional characteristics of data in the en route traffic in the data flows 1 through 4, the adaptive analyzer 130 selects additional data loss inspectors. For example, for data flow 1, PII China (326) and custom 2 (336) data loss inspectors are selected as the en route traffic is destined for a location in China. For data flow 2, PHI USA data loss inspector (328) and PHI UK data loss inspector (330) are selected to efficiently inspect health related data. For data flow 3, credit cards Canada data loss inspector (332), credit card global data loss inspector (214) and custom 1 data loss inspector (334) are selected to efficiently inspect financial data. For data flow 4, driver license USA data loss inspector (322), postal address USA data loss inspector (324) and custom 3 data loss inspector (338) are selected to efficiently inspect personal data. For data flow n, the adaptive analyzer includes data loss inspectors PII global (212), credit card global (214), passport global (323) and custom 4 (340) to efficiently inspect any personal data that is included in the en route traffic received from any remote location.

The data loss inspectors comprise various search logic such as keyword-based search, regular expression-based search, etc. that is customized for detecting presence of sensitive data based on specific data characteristics. The pattern matching logic can be included in data loss inspectors for various compliances and other proprietary data. The data loss inspectors are often referred to by various names such as data identifiers, dictionaries, content control lists, etc. The data loss inspectors are often designed and developed by expert teams and used for implementing DLP policies by applying various pattern matching techniques. The data loss inspectors are developed keeping specific goals in view e.g., PII data loss inspectors are created to protect all personal data, PHI data loss inspectors are built keeping in view data related to personal health details. For example, a credit card number policy applicable globally can be implemented in a data loss inspector with name "CreditordebitcardnumbersGlobal". This data loss inspector is responsible for inspecting credit, debit, travel, store or membership card numbers using a common bank identification numbering system. This detection is included within regional and global account details. Similarly, region (such as Europe, Asia, Americas, Africa, etc.) and country (United States, China, UK, Norway, Japan, etc.) specific data loss inspectors are developed which are specific to that location. Also, custom data loss inspectors can be developed keeping in view enterprise related data privacy policies.

Examples of characteristics (also referred to as primitive traffic characteristics) of data in en route traffic flows can include a source Internet Protocol (or IP) location, a destination Internet Protocol (or IP) location, a source geographic location of the data identified by a latitude value and a longitude value, a destination geographic location of the data identified by a latitude value and a longitude value, an application type, a uniform resource locator (URL), a category of the URL, a reputation score of the URL, a content type of the data, a host location information provided in a hypertext transfer protocol (HTTP) header, etc. These example characteristics are provided for illustration purposes and it is understood that additional characteristics can be used to detect sensitive information in en route traffic flows using the technology disclosed. The detector 134 comprises logic to detect one or more these characteristics in data in en route traffic between traffic exchangers. The together-analyzer (136) component is configured with logic to review the multiplicity of primitive traffic characteristics based on a composite analysis or a roll-up analysis to identify the data loss inspectors that can satisfy the data loss inspection requirements for a given data flow.

The technology disclosed allows periodic and frequent update of the superset of data loss inspectors as new data loss inspectors are developed for new compliance and/or geographic data. New data loss inspectors are added to the superset of data loss inspectors (205) to enhance the scope of the inspection. New data loss inspectors can also be created based on new requirements from enterprises and/or new use cases. Traditional approaches can require interruption to service to make use of these new data loss inspectors as existing techniques require a change in configuration. The technology disclosed allows selection of new data loss inspectors dynamically during runtime. No interruption to service is needed to make use of new data loss inspectors if they are marked with correct labels that match with the respective values of data characteristics. New data loss inspectors can be added to the superset of data loss inspectors and automatically considered for selection by adaptive analyzer 130 for inspecting any en route traffic flow established afterwards.

Selection of data loss inspectors that are based on characteristics of data in en route traffic flows enables decrease in false positive and false negative flagging of sensitive data. Existing data inspection techniques with pre-selected data loss inspectors may not provide accurate identification of sensitive data resulting in false positive and/or false negative results. Traffic inspected using global level (e.g., PII and PHI) data loss inspectors as opposed to region specific data loss inspectors (e.g., region-specific PII and PHI data loss inspectors) may cause such issues. Using region specific data loss inspectors and/or using data loss inspectors that target compliance requirements of a particular en route traffic flow can help in avoiding false positive and/or false negative results.

In existing data loss prevention techniques, the administrators need to understand every data loss inspector before configuring it and for adding it to a set of data loss inspectors for inspection. The technology disclosed removes the administrative overhead, since data loss inspectors are labeled and picked up automatically. The administrators do not have the burden to understand the data loss inspectors and change their configuration, etc. The technology disclosed significantly reduces burden on administrators to understand different data loss inspectors and creation of subsets of data loss inspectors that are relevant for a specific use case.

The technology disclosed also allows use of custom data loss inspectors. Custom data loss inspectors are created for customers (such as enterprises) for their specific use cases (or scenarios). These data loss inspectors are under the control of the customers or end users. It is possible that custom data loss inspectors may undergo changes quite often as the use cases or requirements of respective customers evolve over time. The technology disclosed makes it very easy to manage and use these custom data loss inspectors. Newer versions of custom data loss inspectors can be added to superset of data loss inspectors at any time and at any frequency. As new data flows are established, the technology disclosed selects the most recent version of the custom data loss inspector for data loss inspection without the need of any administrative oversight or manual configuration.

Examples of Data Loss Inspection Using Dynamic Selection of Data Loss Inspectors FIGS. 4 to 9 present various use cases of the technology disclosed in which the adaptive analyzer creates a subset of data loss inspectors from a superset of available data loss inspectors after analyzing data and/or metadata characteristics of data in en route traffic flows between data exchangers. Four different scenarios are presented as examples in FIGS. 4 to 9. In a first scenario, presented in FIGS. 4 to 6, selection of a subset of data loss inspectors is illustrated using composite analysis performed by the adaptive analyzer 130. In a second scenario, presented in FIG. 7, selection of data loss inspectors is illustrated based on roll-up analysis performed by the adaptive analyzer 130. In a third scenario, presented in FIG. 8, selection of data loss inspectors is illustrated based on roll-up analysis performed by adaptive analyzer 130. In this roll-up analysis at least one different data loss inspector is selected from the ones initially selected using data characteristics. In a fourth scenario, selection of data loss inspectors is illustrated based on composite analysis of the adaptive analyzer 130. In this scenario, one or more data inspectors selected in the subset are orthogonal to characteristics of data and/or metadata in en route traffic. Details of the four scenarios are presented below in details with reference to examples in FIGS. 4 to 9.

Figure 4:
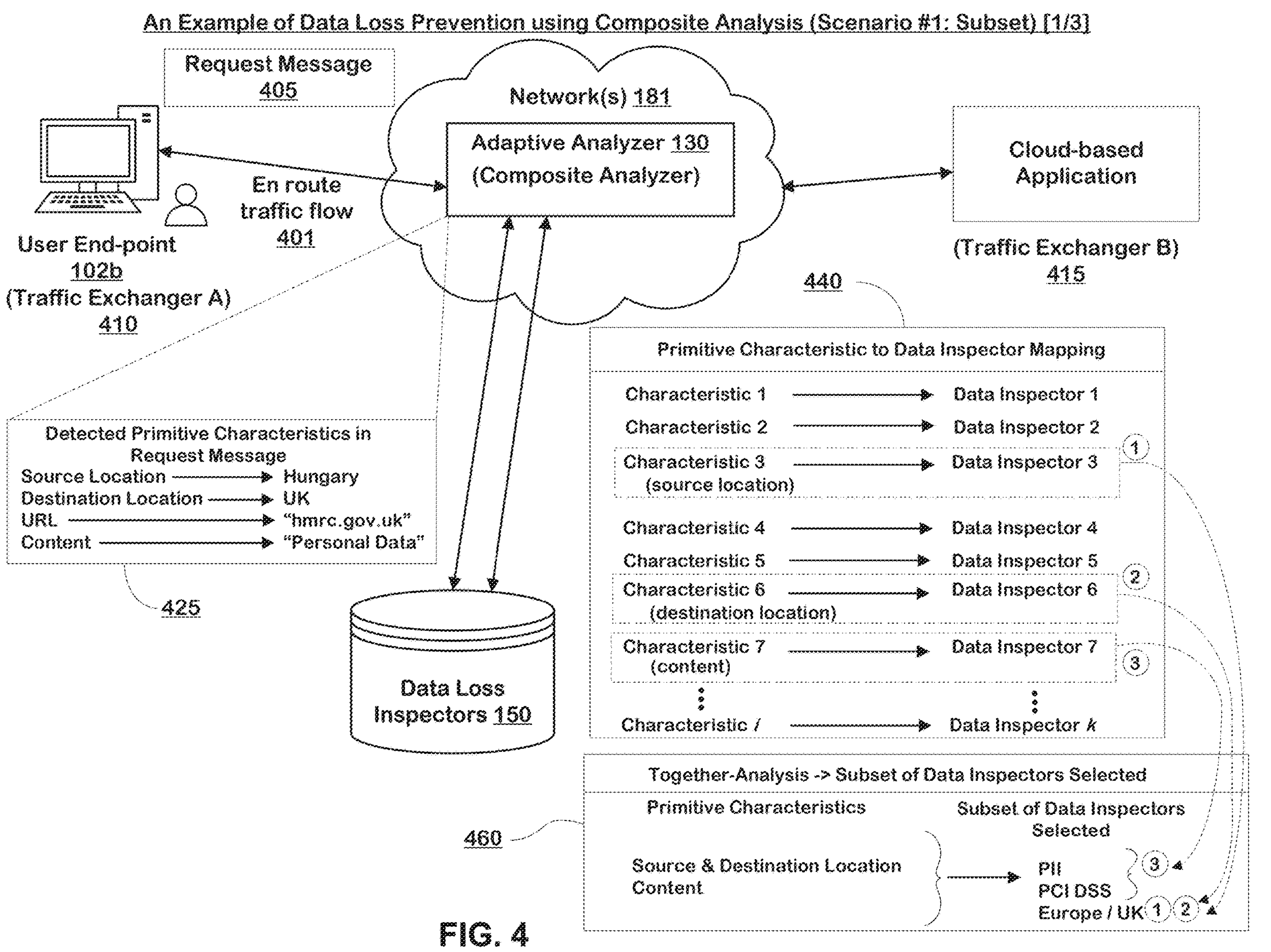
FIGS. 4, 5 and 6 present an example of data loss prevention using a subset of available data loss inspectors selected by the technology disclosed.
Figure 5:
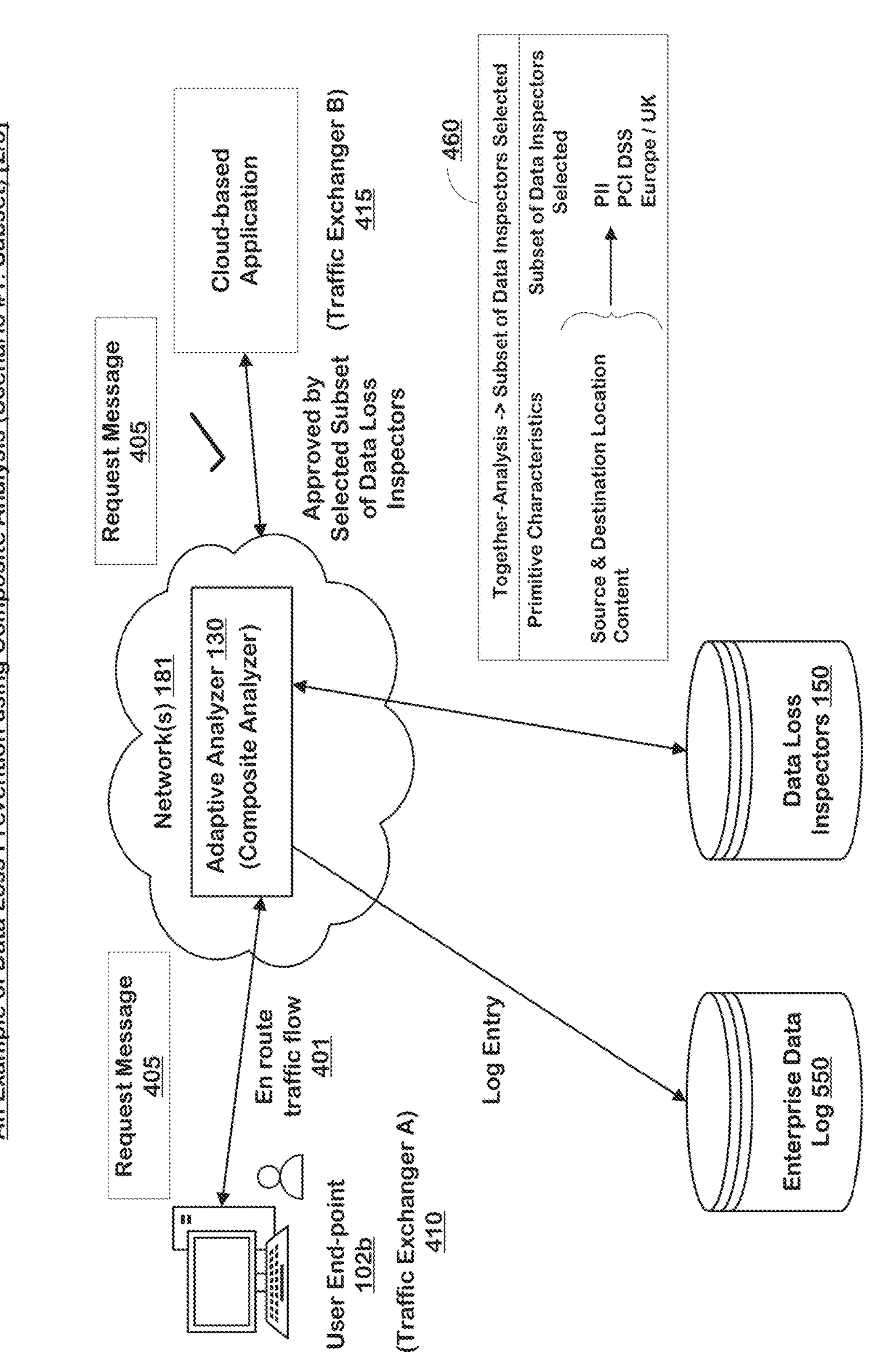
Figure 6:
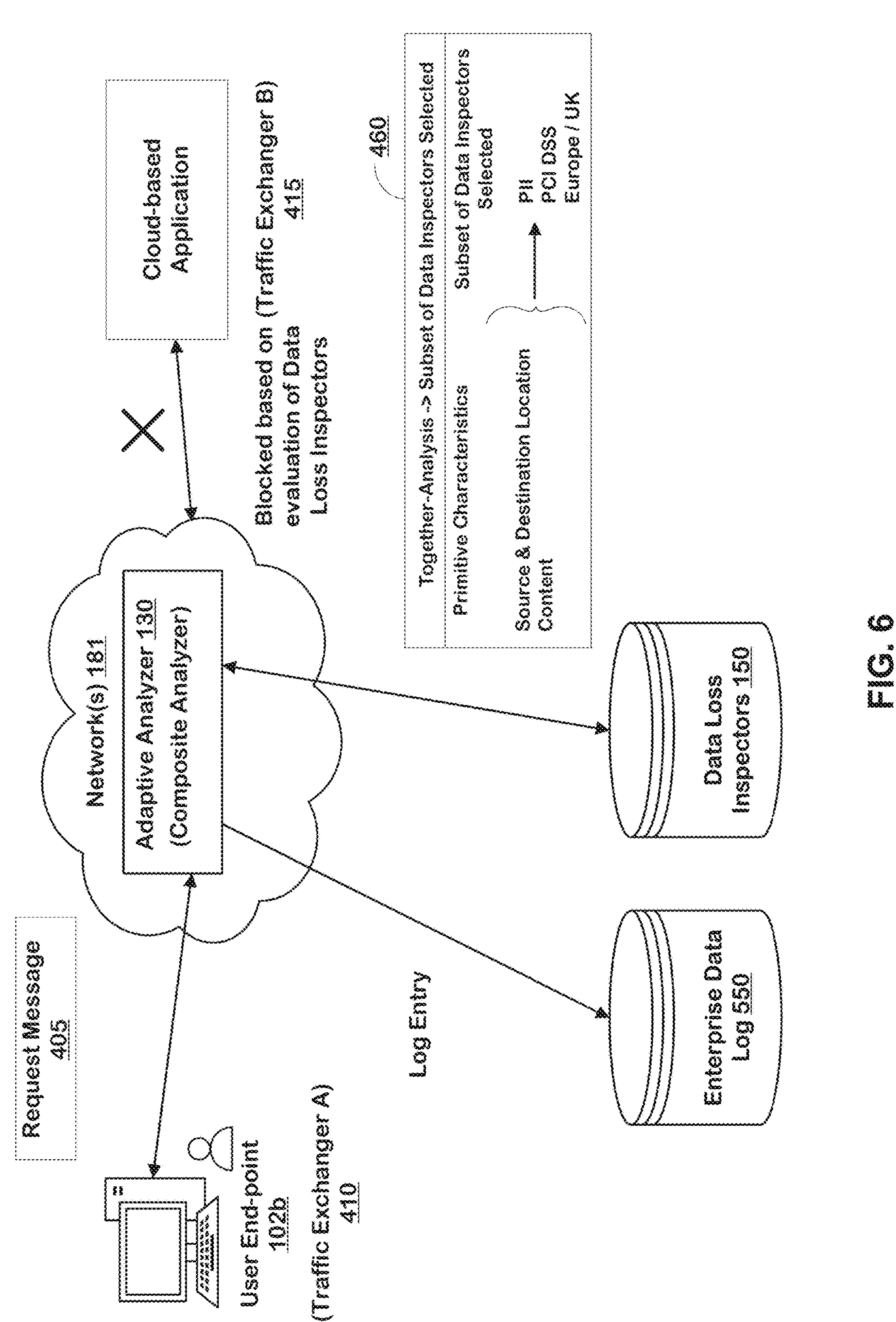

FIGS. 4, 5 and 6 present an example of data loss prevention using a subset of data loss inspectors selected from a superset of data loss inspectors by adaptive analyzer 130. A traffic exchanger A (410) sends a request message 405 to a traffic exchanger B (415). The adaptive analyzer 130 intercepts (using the logic configured in the interceptor 132) the en route traffic flow 401 from traffic exchanger A (410) comprising the request message 405 while it is in transit and before it reaches the traffic exchanger B (415). The adaptive analyzer 130 uses the detector 134 to detect characteristics (also referred to as primitive characteristics) of the data and/or metadata of the request message 405. An illustration 425 presents some of the detected primitive characteristics in the request message 405. The request message comprises a source location characteristic “Hungary”, a destination location characteristic “UK”, a uniform resource locator (URL) characteristic “hmrc.gov.uk” and a content type characteristic as “personal data”. The request message 405 can comprise requests from the user endpoints to the cloud applications. En route traffic flows can comprise responses by the cloud applications to the user endpoint. These response messages are also intercepted by the adaptive analyzer and similar analysis is performed for the response messages to select a subset of data loss inspectors for response messages.

The detector 134 (a subcomponent of the adaptive analyzer 130) is configured with logic to parse the request message 405 and detect (or identify) various characteristics (also referred to as primitive characteristics) of the data and/or the metadata. Parsing is the process of breaking up and analyzing a stream of text into keywords, or other elements. The parsed elements or tokens can be used to determine presence of sensitive data. In one implementation, the detector 134 is configured with logic to perform keyword-based searching for finding sensitive data in en route traffic flow. Keyword-based search technique involves searching for exact matches of specific words or phrases (keywords) within a given text. Using this method, the detector 134 can determine presence of origin location information, destination location information, content type such as personal information, health or financial data information, etc. The technology disclosed can use other searching techniques such as regular expression (or regex) based searching. This method utilizes a specialized sequence of characters (referred to as a “pattern”) to search for and match complex patterns within text, rather than just exact keywords. Regular expressions can use metacharacters and operators to define patterns that can represent a wide range of character sequences, including specific characters, character classes, repetitions, and positions, etc. For example, regular expressions can be used to detect presence of data with predefined patterns such as social security numbers, credit card numbers, phone numbers, email addresses, etc.

The technology disclosed can use other searching techniques to identify presence of sensitive data related to primitive characteristics (or simply data characteristics) presented above. Examples of such techniques include Boolean search, fuzzy search, phrase search, semantic search, stemming and lemmatization-based search, vector space or embedding-based search, etc. In Boolean search, logical operators such as AND, OR, NOT can be used in combination to define inclusion and exclusion of search terms. Fuzzy search allows matching of terms approximately rather than exactly to allow for misspellings and typos. Phrase search allows matching of sequence of words such as “credit card” or “United States”, etc. Semantic search allows searching based on meaning and intent of keywords rather than literal matching of terms. Semantic search can use NLP (natural language processing) techniques. Stemming and lemmatization-based search reduces words or terms to their roots or canonical form to improve matching of terms. Vector space and embedding-based search represents text and queries or keywords in high-dimensional space vectors. Distance between vectors is determined using techniques such as cosine similarity to determine similarity between text and query or keyword. It is understood that the technology disclosed can use the above mentioned techniques or other search techniques to identify presence of sensitive data related to primitive characteristics in the message 405.

The adaptive analyzer 130 is configured with logic to match values of the detected primitive characteristics in the request message 405 with metadata, labels, names or other types of data associated with respective data loss inspectors in the superset of data loss inspectors. The superset of data loss inspectors can be stored in data loss inspectors database 150. For example, an illustration 440 shows a list of characteristics mapped to a list of data loss inspectors. For the example shown in FIG. 4, characteristic 3 (source location), characteristic 6 (destination location) and characteristic 7 (content) are mapped to data inspector 3, data inspector 6 and data inspector 7, respectively. Each of the data inspectors in the list of data inspectors "1" through "k" in the table in illustration 440 can actually comprise a group or cluster of data inspectors such that all of the data loss inspectors in the group or the cluster, match the value of a particular characteristic. For example, characteristic 3 which is related to "source location" matches "data inspector 3" as this data inspector includes a source location value "Hungary" that matches the source location or location characteristic "Hungary" detected in the request message 405. Note that data inspector 3 can in fact comprise a plurality of data inspectors such that all of them include "Hungary" as location characteristic value. Data inspector 3 or a plurality of data inspectors that are included in the cluster or group (labeled as data inspector 3) may also include "Europe" as location characteristic value because "Hungary" is part of European region or continent. Similarly, the destination location characteristic value "UK" maps to data inspector 6 and content characteristic value maps to data inspector 7. As explained above, data inspector 6 and data inspector 7 can also represent a group or cluster of data inspectors all matching respective characteristic values.

The adaptive analyzer 130 selects data inspectors 3, 6 and 7 in the subset of selected data inspectors as shown in the right-side column of table 460 in FIG. 4. Broken lines labeled "1" and "2" show that data inspectors 3 and 6 are selected for Europe and UK geographic locations (table 460) to cover source (Hungary) and destination (UK) locations in the request message 405. A broken line labeled "3" indicates that PII and PCI DSS data inspectors are selected to efficiently inspect the content type (personal data) identified in the request message 405. Therefore, the together-analysis provided by together-analyzer (136) component (part of adaptive analyzer 130) results in determining of the subset of the data loss inspectors that can efficiently inspect the data in request message 405. This subset of the data loss inspectors is minimal as it does not comprise data loss inspectors that are not required to efficiently inspect the data and therefore the inspection of the data in the en route traffic flow requires minimum computing and memory requirements.

FIG. 5 presents an illustration of one possible result of applying policies in the subset of data loss inspectors selected (460) as shown in FIG. 4. The illustration in Fig. presents the case in which the data loss inspectors determine that the data in the request message 405 in en route traffic flow is compliant with the data loss prevention policies. The request message 405 is approved by the selected data loss inspectors and hence it continues for delivery to the traffic exchanger B (415). An entry is stored in the enterprise data log 550 identifying the approval of the request message 405 by the data loss inspectors for audit and review purpose.

FIG. 6 presents an illustration of another possible result of applying policies in the subset of data loss inspectors selected (460) as shown in FIG. 4. FIG. 6 presents the case where the data loss inspectors determine that the data in the request message 405 in en route traffic flow is not compliant with the data loss prevention policies. The request message 405 is thus blocked based on the evaluation of the data loss inspectors. The request message 405 is not delivered to the traffic exchanger B (415). An entry is stored in the enterprise data log 550 identifying the denial or blockage of the request message by the data loss inspectors for audit and review purpose. A message can be sent to the traffic exchanger A (410) informing the user who is operating the user end-point 102*b* of the result of the data loss prevention causing request message 405 to be blocked and not delivered to the traffic exchanger B (415).

Figure 7:
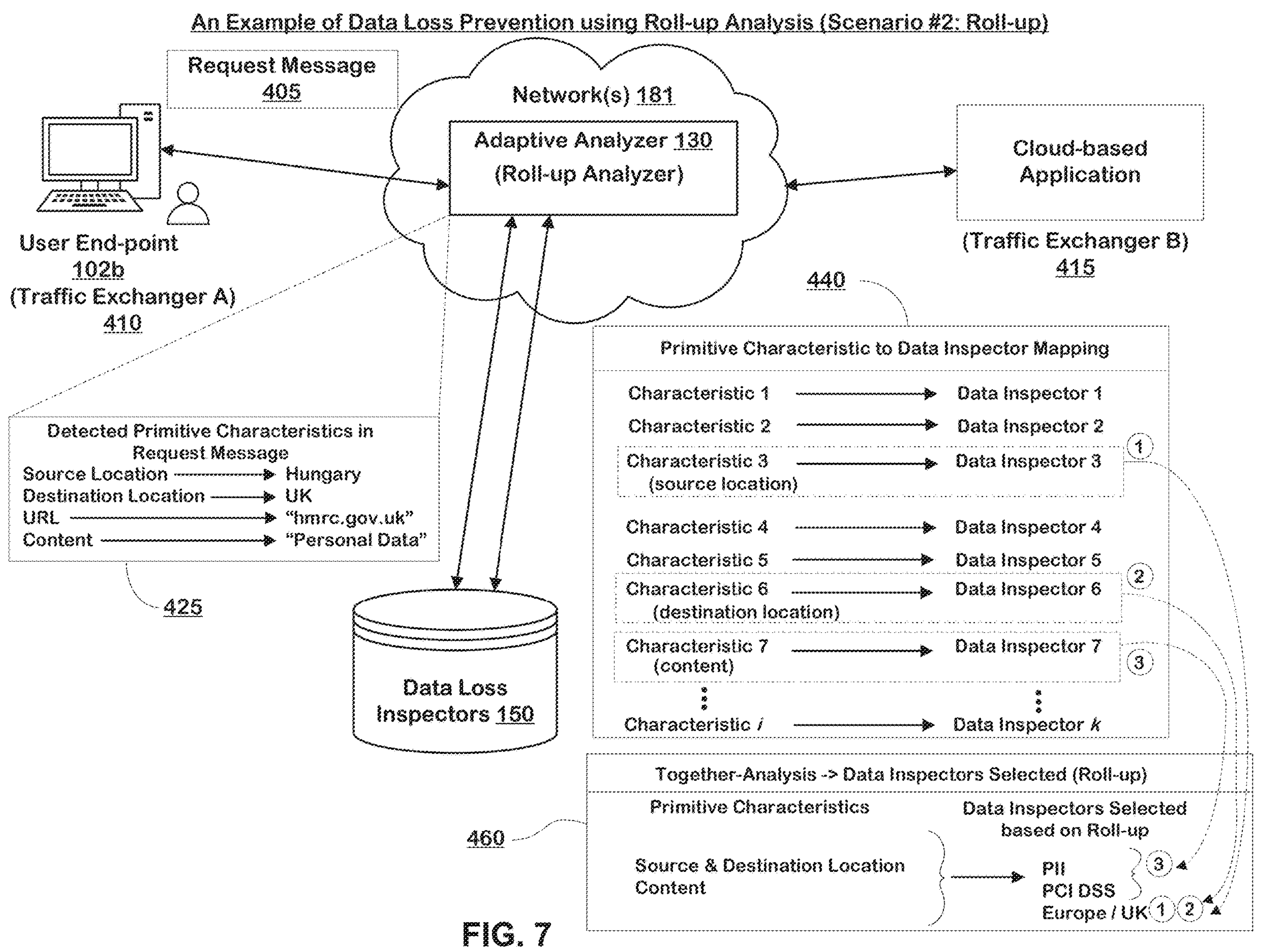
FIG. 7 presents an example of data loss prevention using roll-up analysis to select a subset of data loss inspectors from a superset of data loss inspectors.
Figure 8:
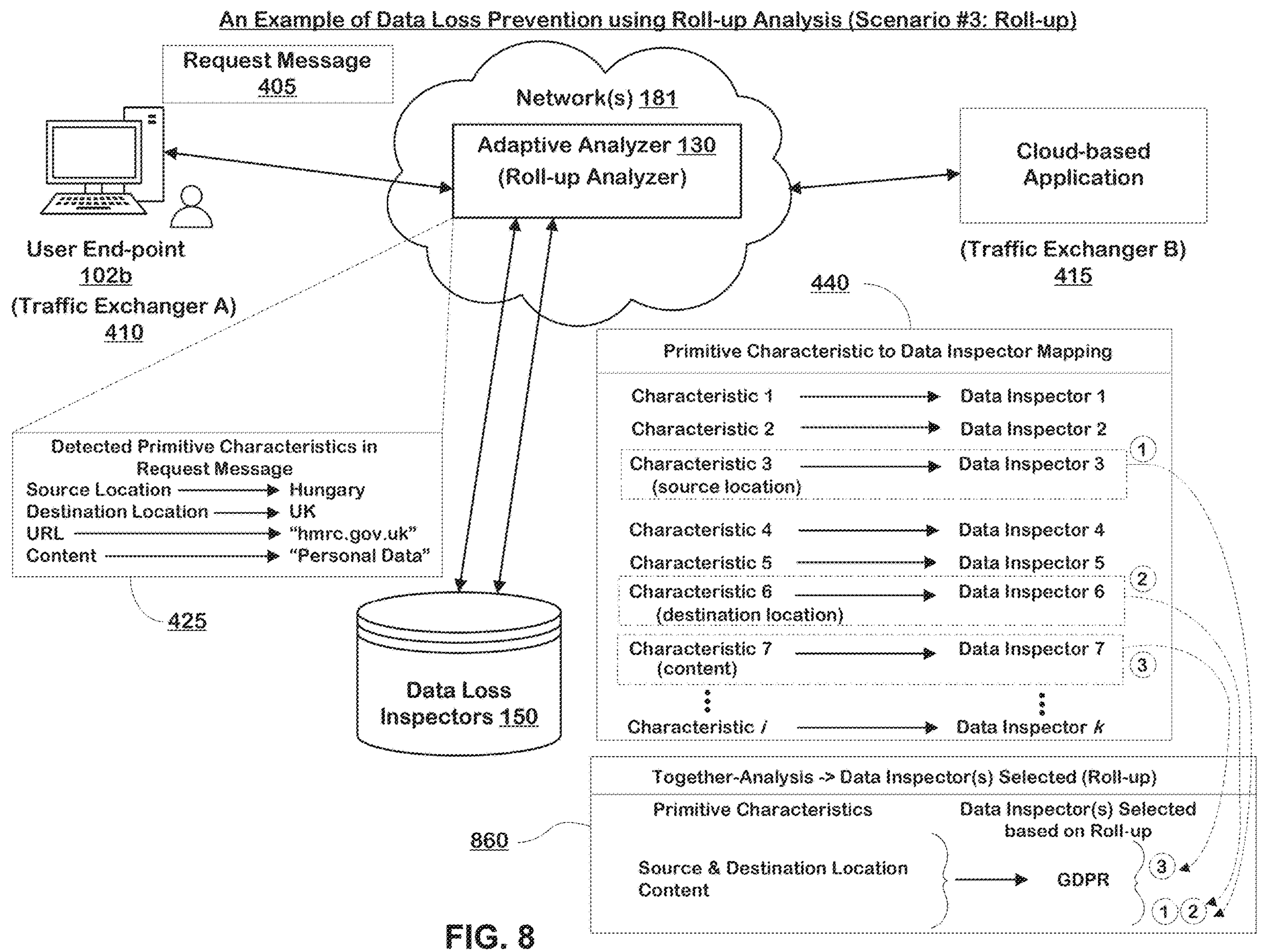
FIG. 8 presents an example of data loss prevention using roll-up analysis to select at least one data loss inspector that is not present in the subset of data loss inspectors.

FIG. 7 presents an example of data loss prevention using roll-up analysis to select a subset of data loss inspectors from a superset of data loss inspectors. In this implementation, the adaptive analyzer 130 performs roll-up analysis to intermediate en route traffic flowing between traffic exchangers in the network of traffic exchangers. The request message 405 is intercepted and characteristics (or primitive characteristics) in the data in en route traffic are detected as shown in illustration 425. The multiplicity of primitive traffic characteristics (or characteristics) are data loss inspectable by a multiplicity of individual data loss inspectors. However, the together-analysis logic implemented in the together-analyzer component 136 determines an optimal set of data loss inspectors by together-analyzing the multiplicity of characteristics (or primitive traffic characteristics or data characteristics) based on a rolled-up view of the multiplicity of primitive traffic characteristics. Based on the together-analysis of the multiplicity of characteristics, the adaptive analyzer in-line determines that at least one umbrella data loss inspector satisfies accurate data loss inspection of the en route traffic flow by aggregating functionalities of the multiplicity of individual data loss inspectors. The adaptive analyzer then selects the umbrella data loss inspector. The adaptive analyzer performs in-line data loss inspecting of the en route traffic flow using the umbrella data loss inspector instead of using the multiplicity of individual data loss inspectors. Consider the example in table in illustration 440 in FIG. 7. The detected characteristics are mapped to data loss inspectors in this table. The characteristics source location, destination location and content are mapped to data loss inspectors 3, 4 and 7 out of a total of "k" data loss inspectors in the superset of data loss inspectors. The data loss inspectors 3, 4 and 7 can each represent a plurality of individual data loss inspectors to which respective characteristics map. For example, the source location characteristic "Hungary" can map to a plurality of data loss inspectors. The together-analysis performed by the adaptive analyzer 130 determines that one umbrella data loss inspector satisfies accurate data loss inspection of enroute traffic as this umbrella data loss inspector aggregates functionalities of the multiplicity of individual data loss inspectors. Therefore, the umbrella data loss inspector is selected for data loss inspection instead of the plurality or multiplicity of individual data loss inspectors. The selection of an umbrella data loss inspector reduces memory and computing requirements for data loss inspection and increases efficiency of data loss inspection process. In some cases, an umbrella data loss inspector can be selected for a plurality of characteristics. For example, the together-analysis can also evaluate if one umbrella data loss inspector can satisfy the data loss inspection for two or more characteristics such as the "source location" and the "destination location" data characteristics. As shown by broken line arrows labeled as "1" and "2", the adaptive analyzer has determined one umbrella data loss inspector labeled as "Europe/UK" in table 460 for both characteristics, i.e., "source location" and "destination location". The roll-up analysis example as shown in FIG. 7 comprises selection of an umbrella data loss inspector from the initial subset of data loss inspectors that are identified by mapping characteristics to data loss inspectors in the superset as shown in table presented in illustration 440. However, in another implementation, the roll-up analysis can determine that a data loss inspector that is not in the subset of data loss inspectors can satisfy the data loss requirements and therefore, select that data loss inspector. FIG. 8 presents an example of this roll-up implementation.

FIG. 8 presents an example of data loss prevention using roll-up analyzer logic of the adaptive analyzer 130. The illustration in FIG. 8 is similar to data loss prevention scenario presented in FIG. 7. However, the together-analysis determines that an umbrella data loss inspector, labeled as "GDPR" can satisfy the data loss prevention requirements for en route traffic flow (see table 860). Note, that in this implementation of the roll-up analysis, the umbrella data loss inspector "GDPR" was not included in the initial subset of data loss inspectors determined by mapping of characteristics to data loss inspectors (table in illustration 440).

Figure 9:
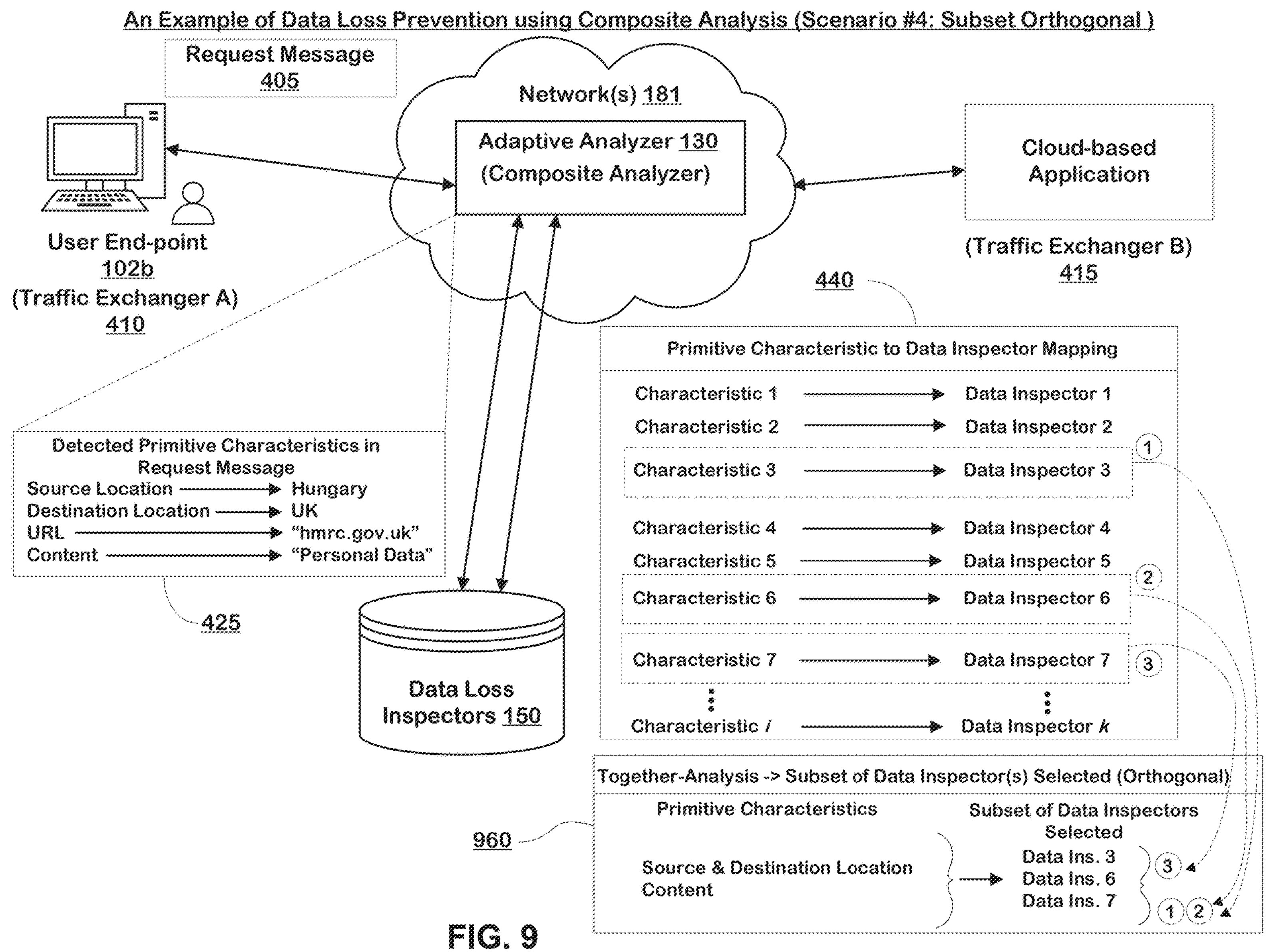
FIG. 9 presents an example of data loss prevention using composite analysis to select a subset of data loss inspectors with orthogonal functionality.

FIG. 9 presents an example of data loss prevention using composite analyzer logic of the adaptive analyzer 130. The illustration in FIG. 9 is similar to data loss prevention scenario presented in FIGS. 4 to 6, however, in this scenario, the adaptive analyzer can select data inspectors that have orthogonal functionality to other data inspectors in the superset of data inspectors (440). The together-analysis performed by the adaptive analyzer can determine suitability of any one or more data inspectors from the superset of data inspectors that may be orthogonal to each other or orthogonal to other data inspectors in the subset of data loss inspectors. For example, as shown in table (440) in FIG. 9, the data inspector 3 and data inspector 6 may have orthogonal functionality to each other. Data inspector 3 may have logic (or policies) to inspect a first geographic region while data inspector 6 may have logic (or policies) to inspect a totally different (or non-overlapping) geographic region with respect to data inspector 3. In one implementation, the adaptive analyzer 130 may determine to select a data loss inspector that may not directly map to a primitive characteristic in the data and/or metadata of en route traffic flow. Such data inspectors may be selected based on other criteria such as based on characteristics of any recent data exfiltration attempts from the organization or enterprise to which the traffic exchanger A (410) belongs. The data analyzer can also consider other characteristics such as data exfiltration and infiltration risks for particular type of applications, organizations, regions, countries, individuals and select data loss inspectors based on together-analysis of all such variables. The subset of data loss inspectors selected by together-analysis are presented in illustration 960 in FIG. 9.

Processes for in-Line Selection of Data Loss Inspectors

FIGS. 10, 11, 12 and 13 present process flowcharts illustrating various methods of in-line (or dynamic) selection of a subset of data loss inspectors from a superset of data loss inspectors for data loss prevention. As with all flowcharts (of process flow diagrams) herein, it will be appreciated that many of the operations, presented in the flowcharts, can be combined, performed in parallel or performed in a different sequence without affecting the functions achieved. In some cases, as the reader will appreciate, a re-arrangement of operations will achieve the same results only if certain other changes are made as well. In other cases, as the reader will appreciate, a re-arrangement of operations will achieve the same results only if certain conditions are satisfied. Furthermore, it will be appreciated that the flowcharts herein show only operations that are pertinent to an understanding of the technology, and it will be understood that numerous additional operations for accomplishing other functions can be performed before, after and between those shown.

FIG. 10 presents an example flowchart illustrating process operations for composite analysis to select data loss inspectors for en route traffic flows. The process starts at an operation 1005 with intercepting of an en route traffic flow between a pair of traffic exchangers in the network of traffic exchangers. The process includes detecting a multiplicity of primitive traffic characteristics of the en route traffic flow (operation 1010). The multiplicity of primitive traffic characteristics are data loss inspectable by "M" data loss inspectors in the superset of data loss inspectors. The process includes together-analyzing the multiplicity of primitive traffic characteristics based on a composite view of the multiplicity of primitive traffic characteristics (operation 1015). The process includes, based on the together-analysis of the multiplicity of primitive traffic characteristics, in-line determining that N data loss inspectors, in a subset of data loss inspectors, satisfy accurate data loss inspection of the en route traffic flow (operation 1020). The number of data loss inspectors in the subset (i.e., "N") is smaller than the number of data loss inspectors in the superset of data loss inspectors (i.e., "M"). The process includes in-line selecting the "N" data loss inspectors, and in-line data loss inspecting the en route traffic flow using the "N" data loss inspectors (operation 1025).

FIG. 11 presents an example flowchart illustrating process operations for roll-up analysis to select data loss inspectors for en route traffic. The process starts at an operation 1105 with interception of an en route traffic flow between a pair of traffic exchangers in the network of traffic exchangers. The process includes detecting a multiplicity of primitive traffic characteristics of the en route traffic flow (operation 1110). The multiplicity of primitive traffic characteristics are data loss inspectable by a multiplicity of individual data loss inspectors. The process includes together-analyzing the multiplicity of primitive traffic characteristics based on a rolled-up view of the multiplicity of primitive traffic characteristics (operation 1115). The process includes inline determining, based on the together-analysis of the multiplicity of primitive traffic characteristics, that at least one umbrella data loss inspector satisfies accurate data loss inspection of the en route traffic flow by aggregating functionalities of the multiplicity of individual data loss inspectors (operation 1120). The process includes in-line selecting the umbrella data loss inspector, and in-line data loss inspecting the en route traffic flow using the umbrella data loss inspector instead of using the multiplicity of individual data loss inspectors (operation 1125).

Figure 12:
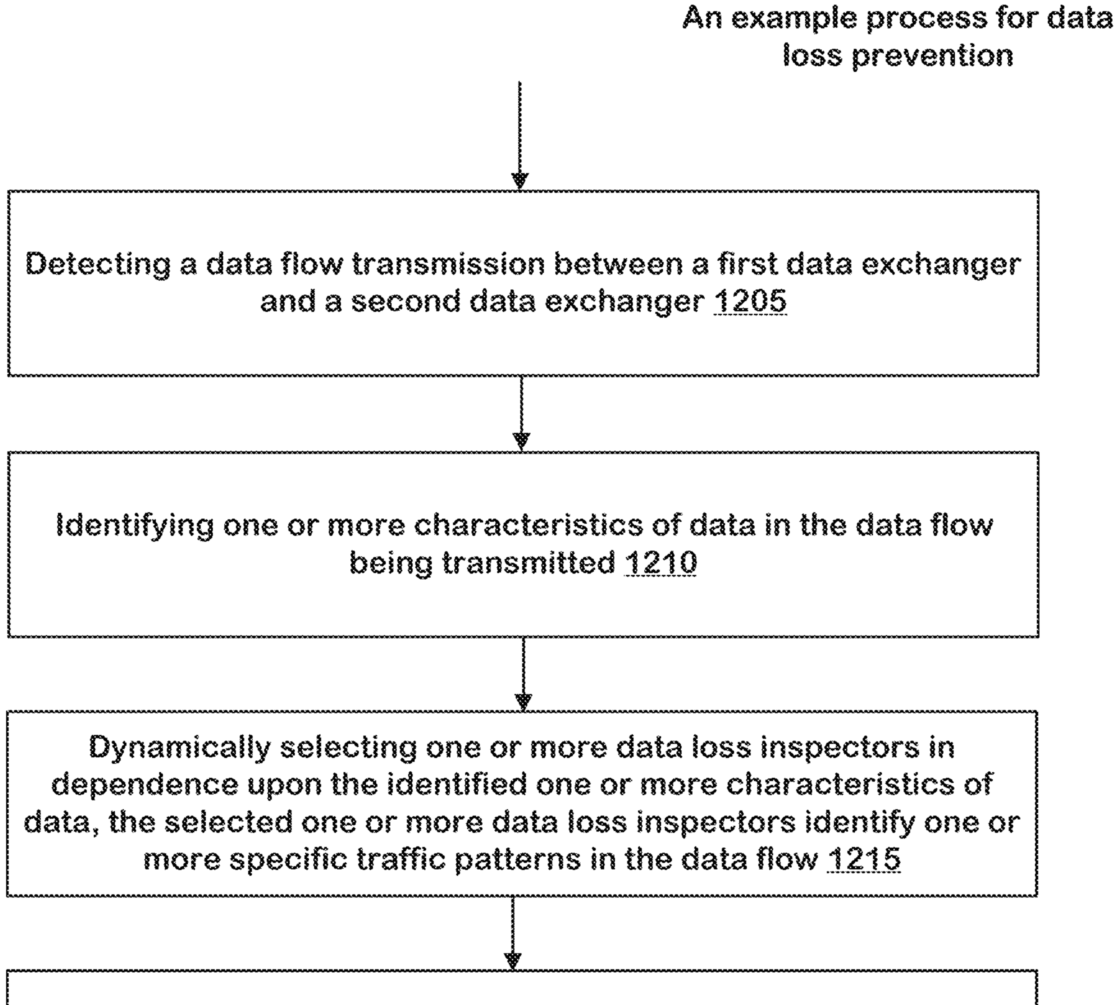
FIG. 12 presents an example flowchart illustrating process operations for dynamically selecting data loss inspectors for en route traffic flow.

FIG. 12 presents an example flowchart illustrating process operations for dynamically selecting data loss inspectors for en route traffic. The process starts at an operation 1205 by detecting a data flow transmission between a first data exchanger and a second data exchanger. The process includes identifying one or more characteristics (also referred to as primitive characteristics) of data in the data flow being transmitted (operation 1210). The process includes dynamically selecting one or more data loss inspectors in dependence upon the identified one or more characteristics of data (operation 1215). The selected one or more data loss inspectors identify one or more specific traffic patterns in the data flow. The process includes applying corresponding pattern matching logic using the selected one or more data loss inspectors to the data flow for the data loss prevention (operation 1220).

Figure 13:
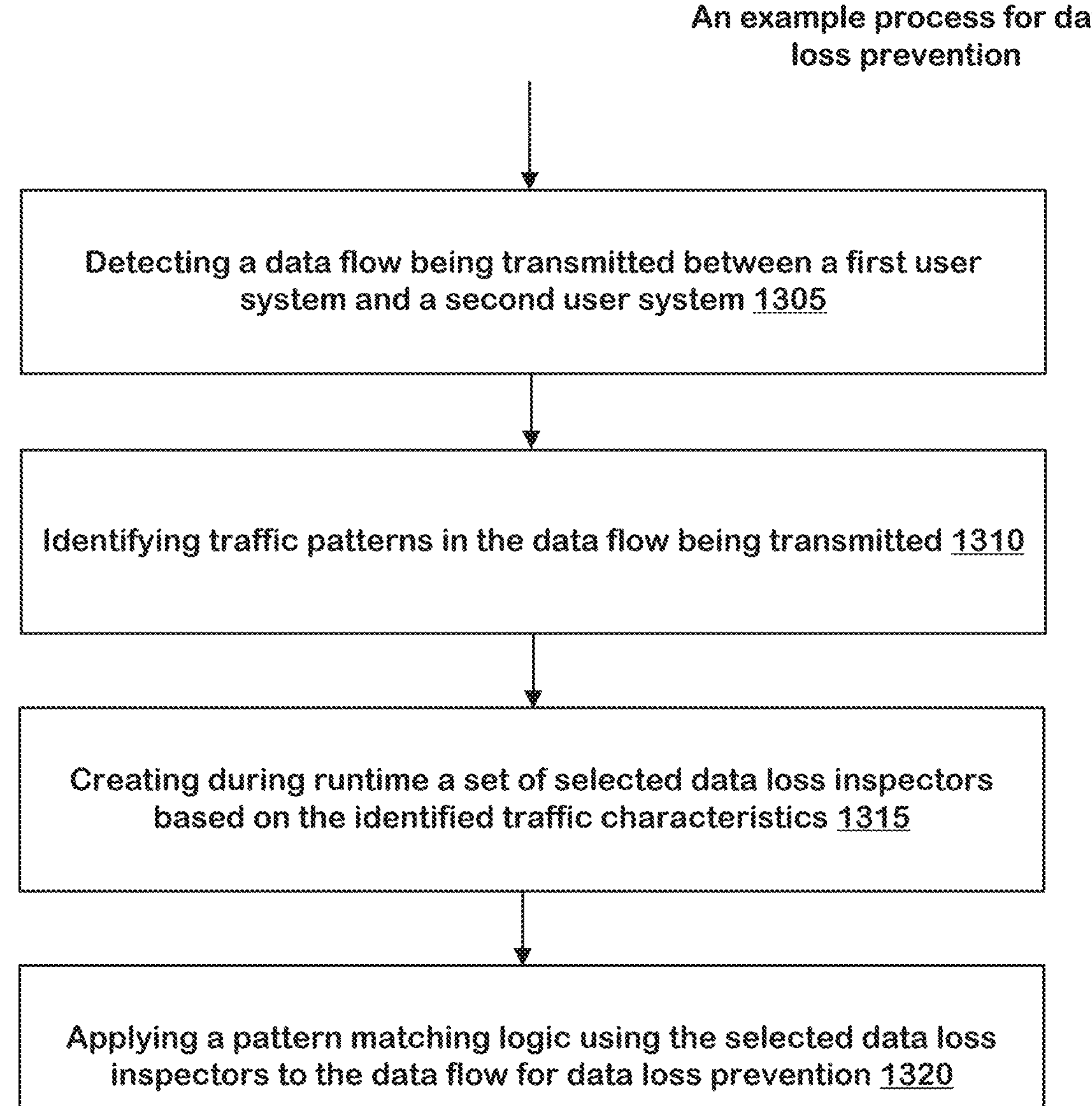
FIG. 13 presents an example flowchart illustrating process operations, in another implementation, for dynamic selection of data loss inspectors for en route traffic flow.

FIG. 13 presents an example flowchart illustrating process operations, in another implementation, for dynamic selection of data loss inspectors for en route traffic flows. The process starts by detecting a data flow being transmitted between a first user system and a second user system (operation 1305). The process includes identifying traffic patterns in the data flow being transmitted (operation 1310). The process includes creating during runtime a subset of selected data loss inspectors based on the identified traffic characteristics (operation 1315). The process includes applying a pattern matching logic using the selected subset of data loss inspectors to the data flow for data loss prevention (operation 1320).

The following section presents a computer system that can be used to implement the data loss inspection methods and systems presented above.

Computer System

Figure 14:
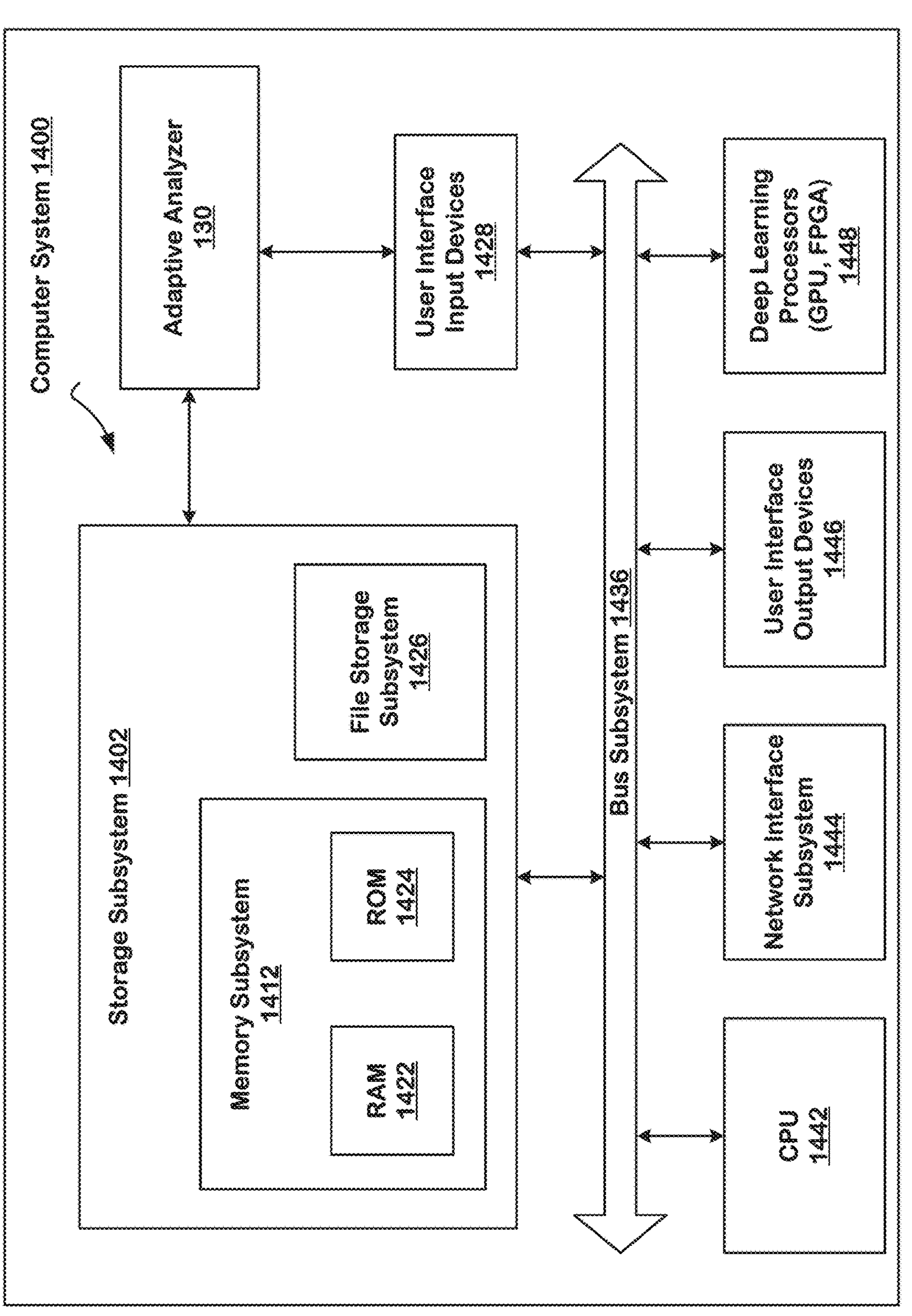
FIG. 14 illustrates an example configuration of a computing device that can be used to implement the systems and techniques described herein.

FIG. 14 shows an example computer system 1400 that can be used to implement the technology disclosed. Computer system 1400 includes at least one central processing unit (CPU) 1442 that communicates with a number of peripheral devices via bus subsystem 1426. These peripheral devices can include a storage subsystem 1402 including, for example, memory devices and a file storage subsystem 1426, user interface input devices 1428, user interface output devices 1446, and a network interface subsystem 1444. The input and output devices allow user interaction with computer system 1400. Network interface subsystem 1444 provides an interface to outside networks, including an interface to corresponding interface devices in other computer systems.

In one implementation, the disclosed system(s) (such as the adaptive analyzer 130) are communicably linked to the storage subsystem 1402 and the user interface input devices 1428.

User interface input devices 1428 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1400.

User interface output devices 1446 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1400 to the user or to another machine or computer system.

Storage subsystem 1402 stores programming and data constructs that provide the functionality of some or all of the modules and methods described herein. These software modules are generally executed by processors 1448.

Processors 1448 can be graphics processing units (GPUs), field-programmable gate arrays (FPGAs), application-specific integrated circuits (ASICs), and/or coarse-grained reconfigurable architectures (CGRAs). Processors 1448 can be hosted by a deep learning cloud platform such as Google Cloud Platform™, Xilinx™, and Cirrascale™. Examples of processors 1448 include Google's Tensor Processing Unit (TPU)™, rackmount solutions like GX4 Rackmount Series™, GX13 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1412 used in the storage subsystem 1402 can include a number of memories including a main random access memory (RAM) 1422 for storage of instructions and data during program execution and a read only memory (ROM) 1424 in which fixed instructions are stored. A file storage subsystem 1426 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1426 in the storage subsystem 1402, or in other machines accessible by the processor.

Bus subsystem 1436 provides a mechanism for letting the various components and subsystems of computer system 1400 communicate with each other as intended. Although bus subsystem 1436 is shown schematically as a single bus, alternative implementations of the bus subsystem can use multiple busses.

Computer system 1400 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1400 depicted in FIG. 14 is intended only as a specific example for purposes of illustrating the preferred implementations of the present technology disclosed. Many other configurations of computer system 1400 are possible having more or less components than the computer system depicted in FIG. 14.

In various implementations, a learning system is provided. In some implementations, a feature vector is provided to a learning system. Based on the input features, the learning system generates one or more outputs. In some implementations, the output of the learning system is a feature vector. In some implementations, the learning system comprises an SVM. In other implementations, the learning system comprises an artificial neural network. In some implementations, the learning system is pre-trained using training data. In some implementations training data is retrospective data. In some implementations, the retrospective data is stored in a data store. In some implementations, the learning system may be additionally trained through manual curation of previously generated outputs.

In some implementations, an object detection pipeline is a trained classifier. In some implementations, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one implementation, the example computer system 1400 can be implemented as part of a computing node. The computing node is only one example of a suitable computing node and is not intended to suggest any limitation as to the scope of use or functionality of embodiments described herein. Regardless, computing node is capable of being implemented and/or performing any of the functionality set forth herein above.

The computing node can comprise the computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed computing environments where tasks are performed by remote processing devices that are linked through a communications network. In a distributed computing environment, program modules may be located in both local and remote computer system storage media including memory storage devices.

As shown in FIG. 14, the computer system/server (in computing node) is shown in the form of a general-purpose computing device. The components of computer system/server may include, but are not limited to, one or more processors or processing units, a system memory, and a bus that couples various system components including system memory to processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server typically includes a variety of computer system readable media. Such media may be any available media that is accessible by computer system/server, and it includes both volatile and non-volatile media, removable and non-removable media.

System memory can include computer system readable media in the form of volatile memory, such as random access memory (RAM) and/or cache memory. Algorithm Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, memory may include at least one program product having a set (e.g., at least one) of program modules that are configured to carry out the functions of embodiments of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments as described herein.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

CLAUSES

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof can be implemented in the form of a computer product, including a non-transitory computer readable storage medium with computer usable program code for performing the method steps indicated. Furthermore, one or more implementations and clauses of the technology disclosed, or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

1. A system for obviating inefficient data loss prevention (DLP) due to redundant consideration of individual traffic characteristics of en route traffic flow, comprising:
   - a composite analyzer interposed amongst a network of traffic exchangers, and configured to intermediate en route traffic flowing between traffic exchangers in the network of traffic exchangers by:
     - intercepting an en route traffic flow between a pair of traffic exchangers in the network of traffic exchangers;
     - detecting a multiplicity of primitive traffic characteristics of the en route traffic flow, wherein the multiplicity of primitive traffic characteristics are data loss inspectable by M data loss inspectors;
     - together-analyzing the multiplicity of primitive traffic characteristics based on a composite view of the multiplicity of primitive traffic characteristics;
     - based on the together-analysis of the multiplicity of primitive traffic characteristics, in-line determining that N data loss inspectors satisfy accurate data loss inspection of the en route traffic flow, wherein N is smaller than M; and
     - in-line selecting the N data loss inspectors, and in-line data loss inspecting the en route traffic flow using the N data loss inspectors.
2. The system of clause 1, wherein the multiplicity of primitive traffic characteristics comprises at least one source location of the en route traffic flow.
3. The system of clause 2, wherein the N data loss inspectors comprise at least one source region-specific data loss inspector selected based on the source location of the en route traffic flow.
4. The system of clause 1, wherein the multiplicity of primitive traffic characteristics comprises at least one destination location of the en route traffic flow.
5. The system of clause 4, wherein the N data loss inspectors comprise at least one destination region-specific data loss inspector selected based on the destination location of the en route traffic flow.
6. The system of clause 1, wherein the multiplicity of primitive traffic characteristics comprises at least one content indicator identifying a type of content transmitted by the en route traffic flow.
7. The system of clause 6, wherein the N data loss inspectors comprise at least one content-specific data loss inspector selected based on the content indicator identifying the type of the content transmitted by the en route traffic flow.
8. The system of clause 1, wherein the multiplicity of primitive traffic characteristics comprises at least one application indicator identifying a type of application facilitating the en route traffic flow.
9. The system of clause 8, wherein the N data loss inspectors comprise at least one application-specific data loss inspector selected based on the application indicator identifying the type of the application facilitating the en route traffic flow.
10. The system of clause 1, wherein the multiplicity of primitive traffic characteristics comprises at least one agent indicator identifying an agent participating in the en route traffic flow.
11. The system of clause 10, wherein the N data loss inspectors comprise at least one agent-specific data loss inspector selected based on the agent indicator identifying the agent participating in the en route traffic flow.
12. The system of clause 1, wherein the network of traffic exchangers comprises client traffic exchangers.
13. The system of clause 12, wherein the client traffic exchangers correspond to user endpoints.
14. The system of clause 13, wherein the network of traffic exchangers comprises server traffic exchangers.
15. The system of clause 14, wherein the server traffic exchangers correspond to cloud applications.
16. The system of clause 15, wherein the en route traffic flow comprises requests from the user endpoints to the cloud applications.
17. The system of clause 16, wherein the en route traffic flow comprises responses by the cloud applications to the user endpoints.
18. The system of clause 1, wherein the multiplicity of primitive traffic characteristics comprises at least one source Internet Protocol (IP) location.
19. The system of clause 18, wherein the multiplicity of primitive traffic characteristics comprises at least one destination IP location.
20. The system of clause 18, wherein the multiplicity of primitive traffic characteristics comprises at least one source geographic location.
21. The system of clause 20, wherein the multiplicity of primitive traffic characteristics comprises at least one latitude value and at least one longitude value of the source geographic location.
22. The system of clause 1, wherein the multiplicity of primitive traffic characteristics comprises at least one uniform resource locator (URL).
23. The system of clause 22, wherein the multiplicity of primitive traffic characteristics comprises at least one category of the URL.
24. The system of clause 22, wherein the multiplicity of primitive traffic characteristics comprises at least one reputation score of the URL.
25. The system of clause 1, wherein the multiplicity of primitive traffic characteristics comprises at least one header.
26. The system of clause 25, wherein the header is a hypertext transfer protocol (HTTP) header.
27. The system of clause 25, wherein the header is a hypertext transfer protocol secure (HTTPS) header.

28. The system of clause 1, wherein the multiplicity of primitive traffic characteristics comprises at least one host geographic location.

29. The system of clause 28, wherein the host geographic location is identified in the header.

30. The system of clause 1, wherein the composite analyzer is further configured to perform the in-line data loss inspection of the en route traffic flow using the N data loss inspectors by in-line analyzing data and metadata of the en route traffic flow to in-line determine compliance of the en route traffic flow with data loss prevention policies of the N data loss inspectors.

31. The system of clause 30, wherein the composite analyzer is further configured to complete the en route traffic flow when the en route traffic flow complies with the data loss prevention policies of the N data loss inspectors.

32. The system of clause 30, wherein the composite analyzer is further configured to suspend the en route traffic flow when the en route traffic flow fails to comply with the data loss prevention policies of the N data loss inspectors.

33. The system of clause 1, wherein the in-line determination and the in-line selection further comprises the composite analyzer choosing the N data loss inspectors after intercepting the en route traffic flow.

34. The system of clause 1, wherein the in-line determination and the in-line selection further comprises the composite analyzer choosing the N data loss inspectors inimitably for the en route traffic flow on a per-flow basis based on the together-analysis of the multiplicity of primitive traffic characteristics.

35. The system of clause 1, wherein the in-line determination and the in-line selection further comprises the composite analyzer choosing the N data loss inspectors directly within a data path of the en route traffic flow.

36. The system of clause 1, wherein the in-line determination and the in-line selection further comprises the composite analyzer choosing the N data loss inspectors on a real-time basis.

37. The system of clause 1, wherein the N data loss inspectors are selected based on the N data loss inspectors aggregating functionalities of the M data loss inspectors, wherein the N data loss inspectors implement the aggregated functionalities of the M data loss inspectors for the accurate data loss inspection of the en route traffic flow.

38. The system of clause 37, wherein the N data loss inspectors are selected from a many-to-one mapping that maps the aggregated functionalities of the M data loss inspectors to the N data loss inspectors.

39. The system of clause 1, wherein the N data loss inspectors are selected based on the N data loss inspectors having orthogonal functionalities independent of functionalities of the M data loss inspectors, wherein the N data loss inspectors implement the orthogonal functionalities for the accurate data loss inspection of the en route traffic flow.

40. The system of clause 1, wherein the M is periodically increased.

41. The system of clause 1, wherein the N data loss inspectors are periodically updated for use in the accurate data loss inspection of future en route traffic flows.

42. The system of clause 1, wherein new selections of the N data loss inspectors are made for use in the accurate data loss inspection of future en route traffic flows.

43. The system of clause 38, wherein the many-to-one mapping is periodically updated for use in the accurate data loss inspection of future en route traffic flows.

44. The system of c clause 1, wherein the N data loss inspectors are used for the in-line data loss inspection throughout a life of the en route traffic flow.

45. The system of clause 44, wherein the life of the en route traffic flow is a session.

46. The system of clause 1, wherein the N data loss inspectors do not overlap with the M data loss inspectors.

47. The system of clause 1, wherein the N data loss inspectors partially overlap with the M data loss inspectors.

48. The system of clause 47, wherein the M data loss inspectors are a superset, wherein the N data loss inspectors are a subset of the superset.

49. The system of clause 6, wherein the content indicator identifies financial content, personal content, health and medical content, source code content, intellectual property content, legal content, payroll content, human resource content, and government content.

50. The system of clause 8, wherein the application indicator identifies financial applications, personal applications, health and medical applications, source code applications, intellectual property applications, legal applications, payroll applications, human resource applications, and government applications.

51. The system of clause 5, wherein the composite analyzer is further configured:

determine an originating geographic region of the en route traffic flow in dependence upon the source location of the en route traffic flow;

determine a destination geographic region of the en route traffic flow in dependence upon the destination location of the en route traffic flow;

determine at least one compliance protocol applicable to the type of the content transmitted by the en route traffic flow and/or the type of application facilitating the en route traffic flow; and making the in-line determination and the in-line selection of the N data loss inspectors based on combination of the originating geographic region, the destination geographic region, and the compliance protocol.

52. The system of clause 51, wherein the compliance protocol is at least one of a Payment Card Industry Data Security Standard (PCI DSS) compliance protocol for financial data, a General Data Protection Regulation (GDPR) compliance protocol for personal data, or a Health Insurance Portability and Accountability Act (HIPAA) compliance protocol for health and medical data.

53. A system for obviating inefficient data loss prevention (DLP) due to redundant application of individual data loss inspectors on en route traffic flow, comprising:

a roll-up analyzer interposed amongst a network of traffic exchangers, and configured to intermediate en route traffic flowing between traffic exchangers in the network of traffic exchangers by:

intercepting an en route traffic flow between a pair of traffic exchangers in the network of traffic exchangers;

detecting a multiplicity of primitive traffic characteristics of the en route traffic flow, wherein the multiplicity of primitive traffic characteristics are data loss inspectable by a multiplicity of individual data loss inspectors;

together-analyzing the multiplicity of primitive traffic characteristics based on a rolled-up view of the multiplicity of primitive traffic characteristics;

based on the together-analysis of the multiplicity of primitive traffic characteristics, in-line determining that at least one umbrella data loss inspector satisfies accurate data loss inspection of the en route traffic flow by aggregating functionalities of the multiplicity of individual data loss inspectors; and in-line selecting the umbrella data loss inspector, and in-line data loss inspecting the en route traffic flow using the umbrella data loss inspector instead of using the multiplicity of individual data loss inspectors.

54. The system of clause 53, wherein the multiplicity of primitive traffic characteristics comprises at least one source location of the en route traffic flow.

55. The system of clause 54, wherein the umbrella data loss inspector is a source region-specific data loss inspector selected based on the source location of the en route traffic flow.

56. The system of clause 53, wherein the multiplicity of primitive traffic characteristics comprises at least one destination location of the en route traffic flow.

57. The system of clause 56, wherein the umbrella data loss inspector is a destination region-specific data loss inspector selected based on the destination location of the en route traffic flow.

58. The system of clause 53, wherein the multiplicity of primitive traffic characteristics comprises at least one content indicator identifying a type of content transmitted by the en route traffic flow.

59. The system of clause 58, wherein the umbrella data loss inspector is a content-specific data loss inspector selected based on the content indicator identifying the type of the content transmitted by the en route traffic flow.

60. The system of clause 53, wherein the multiplicity of primitive traffic characteristics comprises at least one application indicator identifying a type of application facilitating the en route traffic flow.

61. The system of clause 60, wherein the umbrella data loss inspector is an application-specific data loss inspector selected based on the application indicator identifying the type of the application facilitating the en route traffic flow.

62. The system of clause 53, wherein the multiplicity of primitive traffic characteristics comprises at least one agent indicator identifying an agent participating in the en route traffic flow.

63. The system of clause 62, wherein the umbrella data loss inspector is an agent-specific data loss inspector selected based on the agent indicator identifying the agent participating in the en route traffic flow.

64. The system of clause 53, wherein the umbrella data loss inspector is selected from a many-to-one mapping that maps the aggregated functionalities of the multiplicity of individual data loss inspectors to the umbrella data loss inspector.

65. The system of clause 53, wherein the umbrella data loss inspector has orthogonal functionalities independent of the aggregated functionalities of the multiplicity of individual data loss inspectors.

66. The system of clause 1, wherein a size of the multiplicity of individual data loss inspectors is periodically increased.

67. The system of clause 1, wherein new selections of the umbrella data loss inspector are made for use in the accurate data loss inspection of future en route traffic flows.

68. The system of clause 38, wherein the many-to-one mapping is periodically updated for use in the accurate data loss inspection of future en route traffic flows.

68. A computer-implemented method of data loss prevention (DLP), the method including:

detecting a data flow being transmitted between a first user system and a second user system;

identifying one or more characteristics of data in the data flow being transmitted;

dynamically selecting one or more identifier (or data type) objects in dependence upon the identified one or more characteristics (or parameters or traffic parameters) of data wherein the selected one or more identifier (or data type) objects identify one or more specific traffic patterns in the data flow being transmitted; and applying corresponding pattern matching logic using the selected one or more identifier (or data type) objects to the data flow for the data loss prevention.

69. The method of clause 1, wherein the identifier (or data type) objects are dynamically selected during runtime when the data flow is being transmitted based on the traffic patterns identified in the data flow.

70. The method of clause 1, further including:

creating during runtime a set of the selected one or more identifier (or data type) objects based on the identified one or more characteristics of data.

71. The method of clause 70, further including:

periodically adding one or more new identifier (or data type) objects to the set of the selected one or more identifier (or data type) objects.

72. The method of clause 70, further including:

providing one or more custom identifier (or data type) objects created for corresponding use cases under control of a user in the first user system or the second user system.

73. The method of clause 68, wherein a characteristic in the one or more characteristics of data include one or more of the following:

a source Internet Protocol (or IP) location;

a destination Internet Protocol (or IP) location;

a source geographic location identified by a latitude value and a longitude value;

a destination geographic location identified by a latitude value and a longitude value;

an application type;

a uniform resource locator (URL);

a category of the URL;

a reputation score of the URL;

a custom object built for a particular use case;

a content type of data in the data flow;

a host location information provided in a hypertext transfer protocol (HTTP) header; and any other parameter that defines network characteristics.

74. The method of clause 1, wherein a characteristic in the one or more characteristics include one or more geographic locations including:

a source geographic location; or a destination geographic location.

75. A computer-implemented method of data loss prevention (DLP), the method including:

detecting a data flow being transmitted between a first user system and a second user system;

identifying traffic patterns in the data flow being transmitted;

creating during runtime a set of selected identifier (or data type) objects based on the identified traffic parameters; and applying pattern matching logic using the selected identifier (or data type) objects to the data flow for data loss prevention.

What is claimed is:

1. A system for obviating inefficient data loss prevention (DLP) due to redundant consideration of individual traffic characteristics of en route traffic flow, comprising:

at least one processor;

a memory coupled to the at least one processor and storing computer-executable instructions, which when executed by the at least one processor, are configured to implement:

a composite analyzer interposed amongst a network of traffic exchangers, and configured to intermediate en route traffic flowing between traffic exchangers in the network of traffic exchangers by:

intercepting an en route traffic flow between a pair of traffic exchangers in the network of traffic exchangers;

detecting a multiplicity of primitive traffic characteristics of the en route traffic flow, wherein the multiplicity of primitive traffic characteristics are data loss inspectable by M data loss inspectors;

together-analyzing the multiplicity of primitive traffic characteristics based on a composite view of the multiplicity of primitive traffic characteristics;

based on the together-analysis of the multiplicity of primitive traffic characteristics, in-line determining that N data loss inspectors satisfy accurate data loss inspection of the en route traffic flow, wherein N is smaller than M; and in-line selecting the N data loss inspectors, and in-line data loss inspecting the en route traffic flow using the N data loss inspectors.

2. The system of claim 1, wherein the multiplicity of primitive traffic characteristics comprises at least one source location of the en route traffic flow.

3. The system of claim 2, wherein the N data loss inspectors comprise at least one source region-specific data loss inspector selected based on the at least one source location of the en route traffic flow.

4. The system of claim 3, wherein the multiplicity of primitive traffic characteristics comprises at least one destination location of the en route traffic flow.

5. The system of claim 4, wherein the N data loss inspectors comprise at least one destination region-specific data loss inspector selected based on the at least one destination location of the en route traffic flow.

6. The system of claim 5, wherein the multiplicity of primitive traffic characteristics comprises at least one content indicator identifying a type of content transmitted by the en route traffic flow.

7. The system of claim 6, wherein the N data loss inspectors comprise at least one content-specific data loss inspector selected based on the content indicator identifying the type of the content transmitted by the en route traffic flow.

8. The system of claim 6, wherein the composite analyzer is further configured with logic to:

determine an originating geographic region of the en route traffic flow in dependence upon the at least one source location of the en route traffic flow;

determine a destination geographic region of the en route traffic flow in dependence upon the at least one destination location of the en route traffic flow;

determine at least one compliance protocol applicable to the type of the content transmitted by the en route traffic flow and/or the type of application facilitating the en route traffic flow; and making the in-line determination and the in-line selection of the N data loss inspectors based on combination of the originating geographic region, the destination geographic region, and the compliance protocol.

9. The system of claim 8, wherein the compliance protocol is at least one of a Payment Card Industry Data Security Standard (PCI DSS) compliance protocol for financial data, a General Data Protection Regulation (GDPR) compliance protocol for personal data, or a Health Insurance Portability and Accountability Act (HIPAA) compliance protocol for health and medical data.

10. The system of claim 1, wherein the multiplicity of primitive traffic characteristics comprises at least one application indicator identifying a type of application facilitating the en route traffic flow.

11. The system of claim 1, wherein the composite analyzer is further configured to perform the in-line data loss inspection of the en route traffic flow using the N data loss inspectors by in-line analyzing data and metadata of the en route traffic flow to in-line determine compliance of the en route traffic flow with data loss prevention policies of the N data loss inspectors.

12. A system for obviating inefficient data loss prevention (DLP) due to redundant application of individual data loss inspectors on en route traffic flow, comprising:

at least one processor;

a memory coupled to the at least one processor and storing computer-executable instructions, which when executed by the at least one processor, are configured to implement:

a roll-up analyzer interposed amongst a network of traffic exchangers, and configured to intermediate en route traffic flowing between traffic exchangers in the network of traffic exchangers by:

intercepting an en route traffic flow between a pair of traffic exchangers in the network of traffic exchangers; detecting a multiplicity of primitive traffic characteristics of the en route traffic flow, wherein the multiplicity of primitive traffic characteristics are data loss inspectable by a multiplicity of individual data loss inspectors;

together-analyzing the multiplicity of primitive traffic characteristics based on a rolled-up view of the multiplicity of primitive traffic characteristics;

based on the together-analysis of the multiplicity of primitive traffic characteristics, in-line determining that at least one umbrella data loss inspector satisfies accurate data loss inspection of the en route traffic flow by aggregating functionalities of the multiplicity of individual data loss inspectors; and in-line selecting the umbrella data loss inspector, and in-line data loss inspecting the en route traffic flow using the umbrella data loss inspector instead of using the multiplicity of individual data loss inspectors.

13. The system of claim 12, wherein the multiplicity of primitive traffic characteristics comprises at least one content indicator identifying a type of content transmitted by the en route traffic flow.

14. The system of claim 13, wherein the umbrella data loss inspector is a content-specific data loss inspector selected based on the content indicator identifying the type of the content transmitted by the en route traffic flow.

15. The system of claim 12, wherein the multiplicity of primitive traffic characteristics comprises at least one application indicator identifying a type of application facilitating the en route traffic flow.

16. The system of claim 15, wherein the umbrella data loss inspector is an application-specific data loss inspector selected based on the application indicator identifying the type of the application facilitating the en route traffic flow.

17. The system of claim 12, wherein the umbrella data loss inspector is selected from a many-to-one mapping that maps the aggregated functionalities of the multiplicity of individual data loss inspectors to the umbrella data loss inspector.

* * * * *